US006706353B1

(12) United States Patent
Suzuki

(10) Patent No.: US 6,706,353 B1
(45) Date of Patent: Mar. 16, 2004

(54) IMAGE FORMING SUBSTRATE

(75) Inventor: Minoru Suzuki, Tochigi (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/141,526

(22) Filed: Aug. 27, 1998

(30) Foreign Application Priority Data

Aug. 28, 1997 (JP) ........................................ P09-247688
Sep. 1, 1997 (JP) ........................................ P09-251365

(51) Int. Cl.$^{7}$ ................................................ B32B 33/00

(52) U.S. Cl. ................................ 428/40.1; 400/120.01; 400/120.02; 400/120.04; 400/241.2; 400/241.4; 430/13; 430/17; 430/18; 428/40.2; 428/41.6; 428/41.7; 428/41.8; 428/42.1; 428/42.3; 428/46; 428/323; 428/327; 428/352; 428/354; 428/402; 428/402.2; 428/402.21; 428/403; 428/407; 428/913

(58) Field of Search .............................. 428/40.1, 40.2, 428/41.6, 41.7, 41.8, 42.1, 42.3, 46, 327, 323, 402, 402.2, 402.21, 403, 407, 352, 354, 913; 430/17, 13, 18; 400/241.2, 241.4, 120.01, 120.02, 120.04

(56) References Cited

U.S. PATENT DOCUMENTS

| | | | | |
|---|---|---|---|---|
| 2,939,009 A | | 5/1960 | Tien | 250/65 |
| 4,201,404 A | * | 5/1980 | Charbonneau | 427/150 |
| 4,399,209 A | | 8/1983 | Sanders et al. | 430/138 |
| 4,440,846 A | | 4/1984 | Sanders et al. | 430/138 |
| 4,621,040 A | | 11/1986 | Viola | 430/138 |
| 4,644,376 A | | 2/1987 | Usami et al. | 346/215 |
| 5,104,767 A | | 4/1992 | Nakamura | |
| 5,645,920 A | | 7/1997 | Nishiyama | 428/195 |
| 6,210,053 B1 | * | 4/2001 | Suzuki | 400/120.01 |
| 6,402,402 B1 | | 6/2002 | Suzuki et al. | |
| 6,403,166 B1 | | 6/2002 | Suzuki et al. | |
| 6,436,600 B1 | | 8/2002 | Suzuki et al. | |

FOREIGN PATENT DOCUMENTS

| | | |
|---|---|---|
| EP | 0219130 | 4/1987 |
| EP | 279104 | 8/1988 |
| EP | 412570 | 2/1991 |
| EP | 0637513 | 2/1995 |
| GB | 2160671 | 12/1985 |
| GB | 2189895 | 11/1987 |
| GB | 2327767 | 3/1999 |
| JP | 61137787 | 6/1986 |
| JP | 62-51478 | 3/1987 |
| JP | 4-4960 | 1/1992 |

OTHER PUBLICATIONS

English Language Translation of JP 61–137787A.
English Language Abstract of Patent Publication No. JP–62–051478.
English Language Translation of JP 61–137787A.

* cited by examiner

*Primary Examiner*—Nasser Ahmad
(74) *Attorney, Agent, or Firm*—Greenblum & Bernstein, P.L.C.

(57) ABSTRACT

An image-forming substrate has a sheet of paper, and a layer of microcapsules coated over the paper sheet. The microcapsule layer contains at least one type of microcapsules filled with a liquid dye, and a shell wall of each of the microcapsules is composed of resin that exhibits a temperature/pressure characteristic such that, when each of the microcapsules is squashed under a predetermined pressure at a predetermined temperature, the liquid dye seeps from the squashed microcapsule.

61 Claims, 23 Drawing Sheets

IMAGE FORMING SUBSTRATE

BACKGROUND OF THE INVENTION

1. Field of the Invention

The present invention relates to an image-forming substrate coated with a layer of microcapsules filled with dye or ink, on which an image is formed by selectively breaking or squashing the microcapsules in the layer of microcapsules.

2. Description of the Related Art

In a conventional type of image-forming substrate coated with a layer of microcapsules filled with dye or ink, a shell of each microcapsule is formed from a suitable photo-setting resin, and an optical image is recorded and formed as a latent image on the layer of microcapsules by exposing it to light rays in accordance with image-pixel signals. Then, the latent image is developed by exerting a pressure on the layer of microcapsules. Namely, the microcapsules, which are not exposed to the light rays, are broken and squashed, whereby the dye or ink seeps out of the broken and squashed microcapsules, and thus the latent image is visually developed by the seepage of the dye or ink.

Of course, each of the conventional image-forming substrates must be packed so as to be protected from being exposed to light, resulting in wastage of materials. Further, the image-forming substrates must be handled such that they are not subjected to excess pressure due to the softness of unexposed microcapsules, resulting in an undesired seepage of the dye or ink.

Also, a color-image-forming substrate coated with a layer of microcapsules filled with different color dyes or inks, is known. In this substrate, the respective different colors are selectively developed on an image-forming substrate by applying specific temperatures to the layer of color microcapsules. Nevertheless, for fixing, it is necessary to irradiate a developed color using a light of a specific wavelength. Accordingly, a color-image-forming system for forming a color image on the color-image forming substrate is costly, because an additional radiation apparatus for the fixing of a developed color is needed, which in turn increases electric power consumption. Also, since a heating process for the color development and an irradiation process for the fixing of a developed color must be carried out with respect to each color, this hinders a quick formation of a color image on the color-image-forming substrate.

SUMMARY OF THE INVENTION

Therefore, an object of the present invention is to provide an easy-to-handle image-forming substrate coated with a layer of microcapsules filled with dye or ink, in which an image can be quickly formed on the image-forming substrate at a low cost.

In accordance with a first aspect of the present invention, there is provided an image-forming substrate comprising: a base member; and a layer of microcapsules, coated over the base member, that contains at least one type of microcapsules filled with a liquid dye, a shell wall of each of the microcapsules being composed of a resin that exhibits a temperature/pressure characteristic such that, when each of the microcapsules is squashed under a predetermined pressure at a predetermined temperature, the liquid dye seeps from the squashed microcapsule, wherein a viscosity of the liquid dye varies in accordance a degree of surface roughness of the base member such that the seeped liquid dye securely and finely fixes on the base member.

The base member may comprise a printing paper, and as the degree of surface roughness of the printing paper decreases, the viscosity of the liquid dye increases. For example, when the base member comprises an ordinary printing paper exhibiting a high degree of surface roughness, the viscosity of the liquid dye may be approximately 10 cP. Also, when the base member comprises a calendered printing paper exhibiting an intermediate degree of surface roughness, the viscosity of the liquid dye may be approximately 100 cP. Further, when the base member comprises a coated or ferrotype printing paper exhibiting a low degree of surface roughness, and the viscosity of the liquid dye may be approximately 1000 cP.

In accordance with a second aspect of the present invention, there is provided an image-forming substrate comprising: a base member; and a layer of transparent microcapsules, coated over the base member, that contains at least one type of transparent microcapsules filled with a transparent liquid dye such a liquid leuco-pigment, a shell wall of each of the transparent microcapsules being composed of a resin that exhibits a temperature/pressure characteristic such that, when each of the transparent microcapsules is squashed under a predetermined pressure at a predetermined temperature, the transparent liquid dye seeps from the squashed microcapsule and reacts with a transparent color developer to produce a given single color.

In the second aspect of the present invention, the base member may comprise a transparent plastic sheet. In this case, a layer of the transparent color developer is formed on a surface of the transparent plastic sheet formed on a surface thereof, and the transparent microcapsule layer is coated over the transparent color developer layer. Thus, the image-forming substrate can be advantageously utilized to produce a transparency film for an overhead projector. Optionally, the transparent color developer is contained in a transparent binder solution used to form the transparent microcapsule layer.

Also, in the second aspect of the present invention, the base member may comprise a sheet of paper. In this case, a layer of the transparent color developer is formed on a surface of the paper sheet, and the transparent microcapsule layer is coated over the transparent color developer layer. Thus, when the microcapsule is broken or compacted, so that a single color is exhibited due to a seepage of the dye or ink from the broken and compacted microcapsule, the exhibited single color cannot be influenced by the shell of the broken and compacted microcapsule, due to the transparency of the microcapsule shell. Optionally, the transparent color developer may be contained in a binder solution used to form the transparent microcapsule layer.

In accordance with a third aspect of the present invention, there is provided an image-forming substrate comprising: a base member; and a layer of microcapsules, coated over the base member, that contains at least one type of microcapsules filled with a dye, a shell wall of each of the microcapsules being composed of resin that exhibits a temperature/pressure characteristic such that, when each of the microcapsules is squashed under a predetermined pressure at a predetermined temperature, the liquid dye is seeped from the squashed microcapsule, wherein at least one layer of function is incorporated in the image-forming substrate for achieving a given purpose.

The function layer may comprise a sheet of transparent ultraviolet barrier film covering the microcapsule layer. In this case, a preservation of a color image, formed on the image-forming substrate, can be considerably improved due to the existence of the ultraviolet barrier film sheet. Namely, by the ultraviolet barrier film sheet, the formed color image can be prevented from deteriorating due to ultraviolet light. Preferably, the transparent ultraviolet barrier film sheet is covered with a sheet of heat-resistant transparent protective film.

The function layer may comprise a white coat layer formed on a surface of the base member to give a desired white quality to the surface. In this case, the microcapsule layer is formed over the surface of the white coat layer. Also, the function layer may comprise an electrical conductive layer formed on another surface of the base member.

In the third aspect of the present invention, the base member may comprise a sheet of paper, and the function layer may comprise a layer of adhesive formed on another surface of the paper sheet, and a sheet of release paper applied to the adhesive layer. In this case, the image-forming substrate is produced in a form of a seal sheet, a piece of which may be utilized as a seal adapted to be adhered to a post card, an envelop, a package or the like.

The base member may comprise a sheet of film composed of a suitable synthetic resin, and the function layer may comprise a peeling layer formed over a surface of the film sheet, and a layer of transparent ultraviolet barrier formed on the peeling layer. In this case, the image-forming substrate is produced in a form of a transfer film sheet, and is used together with a printing sheet of paper. Namely, an image is once formed on the transfer film sheet, and is then transferred from the transfer film sheet to the printing paper sheet. Further, a preservation of the transferred image can be considerably improved because the transferred image is coated with a thermally-fused transparent material, derived from the ultraviolet barrier layer.

The base member also may comprise a sheet of film composed of a suitable transparent synthetic resin, and the function layer may comprise a peeling layer formed on a surface of the transparent film sheet, and a layer of transparent ultraviolet barrier formed on the peeling layer, the microcapsule layer being coated over the transparent ultraviolet barrier layer. In this case, the image-forming substrate is also produced in a form of a transfer film sheet, and is used together with a printing sheet of paper. Similar to the above-mentioned transfer film sheet, an image is once formed on the transfer film sheet, and is then transferred from the transfer film sheet to the printing paper sheet. Nevertheless, after the transfer of the image from the transfer film sheet to the printing paper sheet, the remaining transfer film sheet can be utilized as a transparency film carrying a negative image. Also, a preservation of the transferred image can be considerably improved because the transferred image is coated with a thermally-fused transparent material, derived from the ultraviolet barrier layer.

The base member may comprise a sheet of board paper, and the function layer may comprise a heat-sensitive recording layer formed on another surface of the board paper sheet. In this case, the image-forming substrate can be advantageously utilized as a post card.

The base member may comprise a sheet composed of a suitable transparent synthetic resin, and the function layer may comprise a heat-sensitive recording layer formed on another surface of the transparent sheet. In this case, the heat-sensitive recording layer is used for producing a black dot on the image-forming substrate.

In accordance with a fourth aspect of the present invention, there is provided an image-forming substrate which is produced in a form of a duplicating-paper sheet or a double-recording-paper sheet. Namely, the image-forming substrate comprises: a first image-forming substrate element that includes a first sheet of paper and a first layer of microcapsules coated over a surface of the first paper sheet, the first microcapsule layer containing at least one type of microcapsules filled with a dye, a shell of wall of each of the microcapsules being composed of a resin that exhibits a temperature/pressure characteristic such that, when each of the microcapsules is squashed under a first predetermined pressure at a first predetermined temperature, the dye seeps from the squashed microcapsule; a second image-forming substrate element that includes a second sheet of paper and a second layer of microcapsules coated over a surface of the second paper sheet, the second microcapsule layer containing at least one type of microcapsules filled with a dye, a shell of wall of each of the microcapsules being composed of a resin that exhibits a temperature/pressure characteristic such that, when each of the microcapsules is squashed under a second predetermined pressure at a second predetermined temperature, the dye seeps from the squashed microcapsule; and an peeling layer interposed between the first and second image-forming substrate elements, wherein the first and second predetermined pressures and the first and second predetermined temperatures are simultaneously applied to the first and second image forming substrate elements, and the second image-forming substrate is peelable from the peeling layer.

In the above-mentioned aspects of the present invention, the resin of the shell wall may be a shape memory resin that exhibits a glass-transition temperature corresponding to the predetermined temperature.

Optionally, the shell wall may comprise a double-shell wall. In this case, one shell wall element of the double-shell wall is composed of a shape memory resin, and another shell wall element of the double-shell wall is composed of a resin not exhibiting a shape memory characteristic, such that the temperature/pressure characteristic is a resultant temperature/pressure characteristic of both the shell wall elements.

Also, the shell wall may comprise a composite-shell wall including at least two shell wall elements formed of different types of resin not exhibiting a shape memory characteristic, such that the temperature/pressure characteristic is a resultant temperature/pressure characteristic of the shell wall elements.

BRIEF DESCRIPTION OF THE DRAWINGS

The object and other objects of the present invention will be better understood from the following description, with reference to the accompanying drawings in which.

DESCRIPTION OF THE PREFERRED EMBODIMENTS

Figure 1:
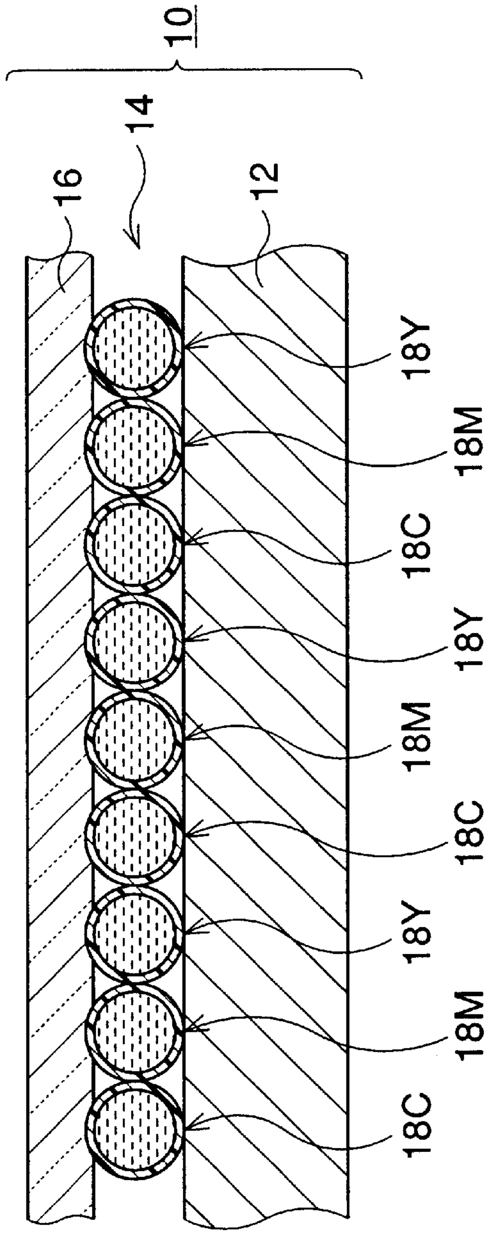
FIG. 1 is a schematic conceptual cross sectional view showing a first embodiment of an image-forming substrate, according to the present invention, comprising a layer of microcapsules including a first type of cyan microcapsules filled with a cyan ink, a second type of magenta microcapsules filled with a magenta ink and a third type of yellow microcapsules filled with a yellow ink.

FIG. 1 shows a first embodiment of an image-forming substrate, generally indicated by reference 10, according to the present invention. In this first embodiment, the image-forming substrate 10 is produced in a form of paper sheet. In particular, the image-forming substrate 10 comprises a sheet of paper 12, a layer of microcapsules 14 coated over a surface of the sheet of paper 12, and a sheet of transparent protective film 16 covering the microcapsule layer 14.

The microcapsule layer 14 is formed from three types of microcapsules: a first type of microcapsules 18C filled with cyan liquid dye or ink, a second type of microcapsules 18M filled with magenta liquid dye or ink, and a third type of microcapsules 18Y filled with yellow liquid dye or ink, and these three types of microcapsules are uniformly distributed in the microcapsule layer 14. In each type of microcapsule (18C, 18M, 18Y), a shell of a microcapsule is formed of a synthetic resin material, usually colored white. Also, each type of microcapsule (18C, 18M, 18Y) may be produced by a well-known polymerization method, such as interfacial polymerization, in-situ polymerization or the like, and may have an average diameter of several microns, for example, 5 $\mu$ to 10 $\mu$.

Note, when the sheet of paper 12 is colored with a single color pigment, the resin material of the microcapsules 18C, 18M and 1BY may be colored by the same single color pigment.

For the uniform formation of the layer of microcapsules 14, for example, the same amounts of cyan, magenta and yellow microcapsules 18C, 18M and 18Y are homogeneously mixed with a suitable binder solution to form a suspension, and the sheet of paper 12 is coated with the binder solution, containing the suspension of microcapsules 18C, 18M and 18Y, by using an atomizer. In FIG. 1, for the convenience of illustration, although the layer of microcapsules 14 is shown as having a thickness corresponding to the diameter of the microcapsules 18C, 18M and 18Y, in reality, the three types of microcapsules 18C, 18M and 18Y overlay each other, and thus the layer of microcapsules 14 has a larger thickness than the diameter of a single microcapsule 18C, 18M or 18Y.

In the first embodiment of the image-forming substrate 10, for the resin material of each type of microcapsule (18C, 18M, 18Y), a shape memory resin is utilized. For example, the shape memory resin is represented by a polyurethane-based-resin, such as polynorbornene, trans-1, 4-polyisoprene polyurethane. As other types of shape memory resin, a polyimide-based resin, a polyamide-based resin, a polyvinyl-chloride-based resin, a polyester-based resin and so on are also known.

Figure 2:
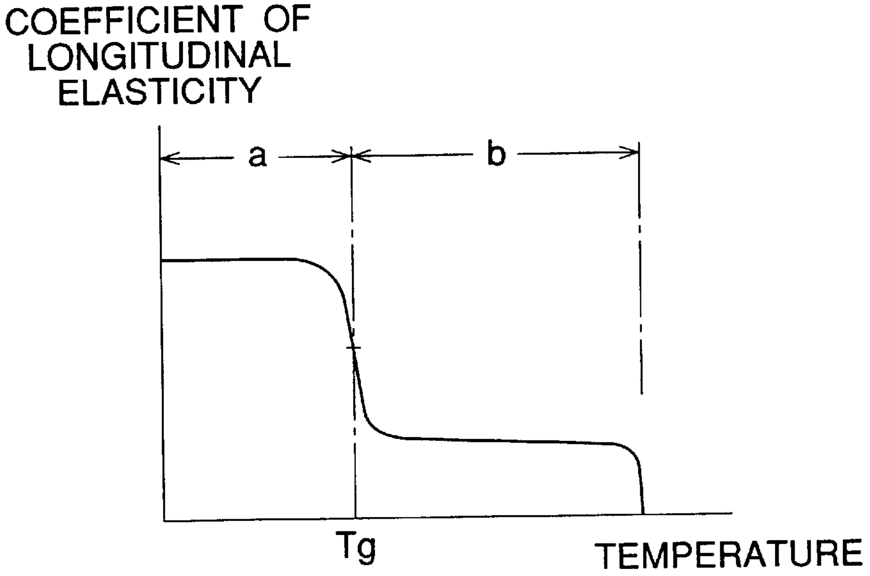
FIG. 2 is a graph showing a characteristic curve of a longitudinal elasticity coefficient of a shape memory resin.

In general, as shown in a graph of FIG. 2, the shape memory resin exhibits a coefficient of longitudinal elasticity, which abruptly changes at a glass-transition temperature boundary $T_g$. In the shape memory resin, Brownian movement of the molecular chains is stopped in a low-temperature area "a", which is less than the glass-transition temperature $T_g$, and thus the shape memory resin exhibits a glass-like phase. On the other hand, Brownian movement of the molecular chains becomes increasingly energetic in a high-temperature area "b", which is higher than the glass-transition temperature $T_g$, and thus the shape memory resin exhibits a rubber elasticity.

The shape memory resin is named due to the following shape memory characteristic: after a mass of the shape memory resin is worked into a shaped article in the low-temperature area "a", when such a shaped article is heated over the glass-transition temperature $T_g$, the article becomes freely deformable. After the shaped article is deformed into another shape, when the deformed article is cooled to below the glass-transition temperature $T_g$, the other shape of the article is fixed and maintained. Nevertheless, when the deformed article is again heated to above the glass-transition temperature $T_g$, without being subjected to any load or external force, the deformed article returns to the original shape.

In the image-forming substrate or sheet 10 according to this invention, the shape memory characteristic per se is not utilized, but the characteristic abrupt change of the shape memory resin in the longitudinal elasticity coefficient is utilized, such that the three types of microcapsules 18C, 18M and 18Y can be selectively broken and squashed at different temperatures and under different pressures, respectively.

Figure 3:
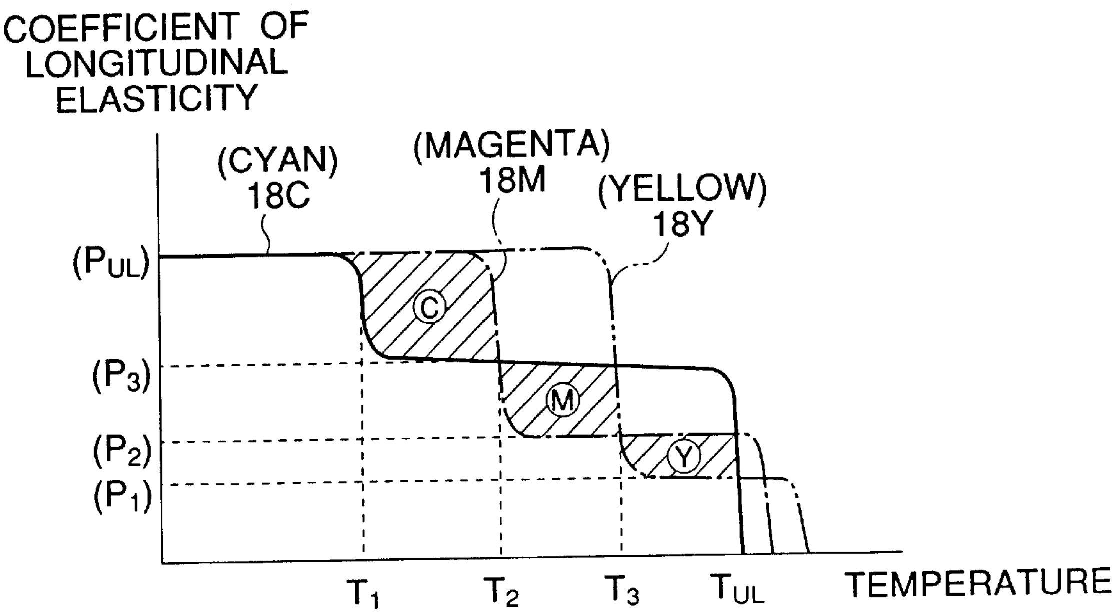
FIG. 3 is a graph showing temperature/pressure breaking characteristics of the respective cyan, magenta and yellow microcapsules shown in FIG. 1, with respective hatched area indicating each of a cyan-producing area, a magenta producing area and a yellow-producing area.

As shown in a graph of FIG. 3, a shape memory resin of the cyan microcapsules 18C is prepared so as to exhibit a characteristic longitudinal elasticity coefficient having a glass-transition temperature $T_1$, indicated by a solid line; a shape memory resin of the magenta microcapsules 18M is prepared so as to exhibit a characteristic longitudinal elasticity coefficient having a glass-transition temperature $T_2$, indicated by a single-chained line; and a shape memory resin of the yellow microcapsules 18Y is prepared so as to exhibit a characteristic longitudinal elasticity coefficient having a glass-transition temperature $T_3$, indicated by a double-chained line.

Note, by suitably varying compositions of the shape memory resin and/or by selecting a suitable one from among various types of shape memory resin, it is possible to obtain the respective shape memory resins, with the glass-transition temperatures $T_1$, $T_2$ and $T_3$. For example, the respective glass-transition temperatures $T_1$, $T_2$ and $T_3$ may be 70° C., 110° C. and 130° C.

Figure 4:
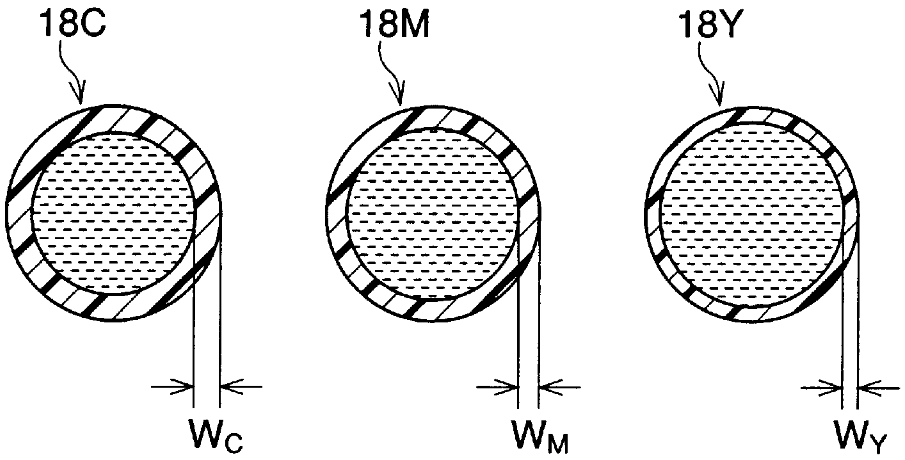
FIG. 4 is a schematic cross-sectional view showing different shell wall thicknesses of the respective cyan, magenta and yellow microcapsules shown in FIG. 1.

As shown in FIG. 4, the microcapsule walls of the cyan microcapsules 18C, magenta microcapsules 18M, and yellow microcapsules 18Y, respectively, have differing thicknesses $W_C$, $W_M$ and $W_Y$. The thickness $W_C$ of cyan microcapsules 18C is larger than the thickness $W_M$ of magenta microcapsules 18M, and the thickness $W_M$ of magenta microcapsules 18M is larger than the thickness $W_Y$ of yellow microcapsules 18Y.

Also, the wall thickness $W_C$ of the cyan microcapsules 18C is selected such that each cyan microcapsule 18C is broken and compacted under a breaking pressure that lies between a critical breaking pressure $P_3$ and an upper limit pressure $P_{UL}$ (FIG. 3), when each cyan microcapsule 18C is heated to a temperature between the glass-transition temperatures $T_1$ and $T_2$; the wall thickness $W_M$ of the magenta microcapsules 18M is selected such that each magenta microcapsule 18M is broken and compacted under a breaking pressure that lies between a critical breaking pressure $P_2$ and the critical breaking pressure $P_3$ (FIG. 3), when each magenta microcapsule 18M is heated to a temperature between the glass-transition temperatures $T_2$ and $T_3$; and the wall thickness $W_Y$ of the yellow microcapsules 18Y is selected such that each yellow microcapsule 18Y is broken and compacted under a breaking pressure that lies between a critical breaking pressure $P_1$ and the critical breaking pressure $P_2$ (FIG. 3), when each yellow microcapsule 18Y is heated to a temperature between the glass-transition temperature $T_3$ and an upper limit temperature $T_{UL}$.

Note, the upper limit pressure $P_{UL}$ and the upper limit temperature $T_{UL}$ are suitably set in view of the characteristics of the used shape memory resins.

As is apparent from the foregoing, by suitably selecting a heating temperature and a breaking pressure, which should be exerted on the image-forming sheet 10, it is possible to selectively break and squash the cyan, magenta and yellow microcapsules 18C, 18M and 18Y.

Figure 5:
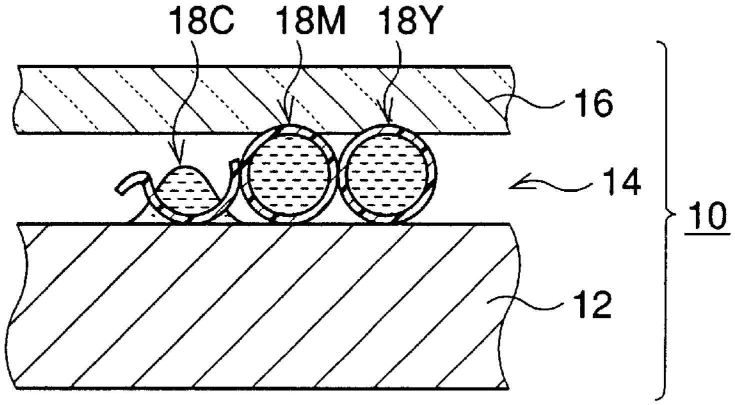
FIG. 5 is a schematic conceptual cross-sectional view similar to FIG. 1, showing only a selective breakage of one of the cyan microcapsules in the layer of microcapsules.

For example, if the selected heating temperature and breaking pressure fall within a hatched cyan area C (FIG. 3), defined by a temperature range between the glass-transition temperatures $T_1$ and $T_2$ and by a pressure range between the critical breaking pressure $P_3$ and the upper limit pressure $P_{UL}$, only the cyan microcapsules 18C are broken and squashed, as shown in FIG. 5. Also, if the selected heating temperature and breaking pressure fall within a hatched magenta area M, defined by a temperature range between the glass-transition temperatures $T_2$ and $T_3$ and by a pressure range between the critical breaking pressures $P_2$ and $P_3$ only the magenta microcapsules 18M are broken and squashed. Further, if the selected heating temperature and breaking pressure fall within a hatched yellow area Y, defined by a temperature range between the glass-transition temperature $T_3$ and the upper limit temperature $T_{UL}$ and by a pressure range between the critical breaking pressures $P_1$ and $P_2$ only the yellow microcapsules 18Y are broken and squashed.

Accordingly, if the selection of a heating temperature and a breaking pressure, which should be exerted on the image-forming sheet 10, are suitably controlled in accordance with digital color image-pixel signals: digital cyan image-pixel signals, digital magenta image-pixel signals and digital yellow image-pixel signals, it is possible to form a color image on the image-forming sheet 10 on the basis of the digital color image-pixel signals.

Figure 6:
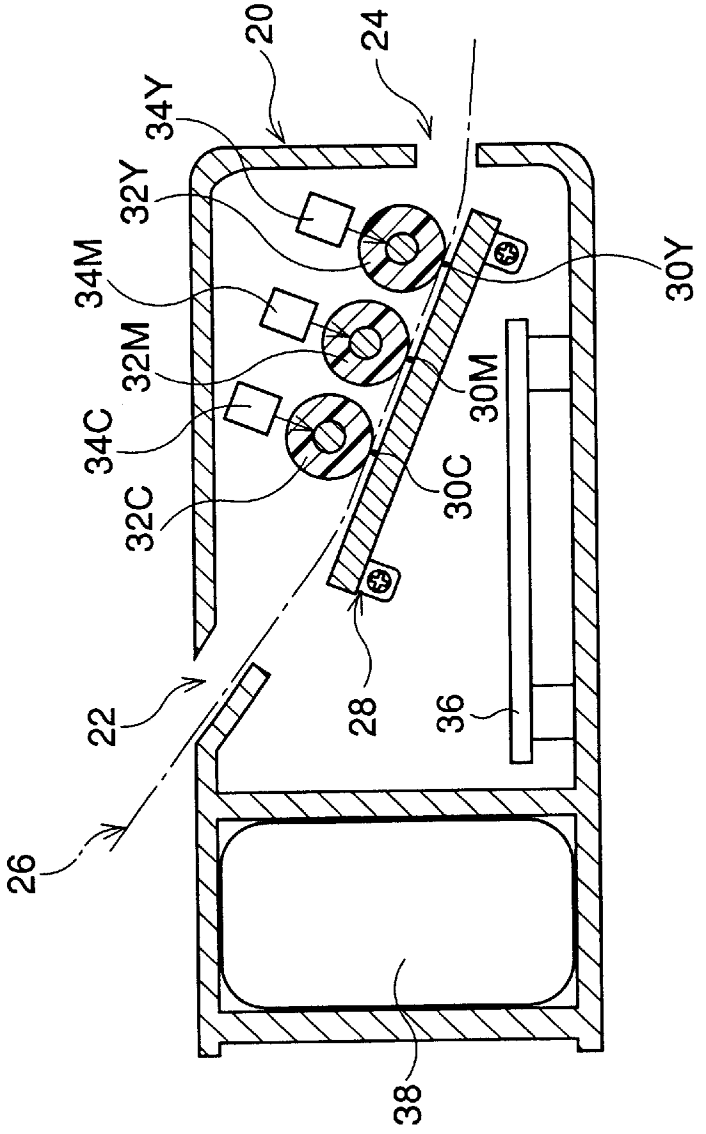
FIG. 6 is a schematic cross-sectional view of a color printer for forming a color image on the image-forming substrate shown in FIG. 1.

FIG. 6 schematically shows a thermal color printer, which is constituted as a line printer so as to form a color image on the image-forming sheet 10.

The color printer comprises a rectangular parallelopiped housing 20 having an entrance opening 22 and an exit opening 24 formed in a top wall and a side wall of the housing 20, respectively. The image-forming sheet 10 is introduced into the housing 20 through the entrance opening 22, and is then discharged from the exit opening 24 after the formation of a color image on the image-forming sheet 10. Note, in FIG. 6, a path 26 for movement of the image-forming sheet 10 is indicated by a chained line.

A guide plate 28 is provided in the housing 20 so as to define a part of the path 26 for the movement of the image-forming sheet 10, and a first thermal head 30C, a second thermal head 30M and a third thermal head 30Y are securely attached to a surface of the guide plate 28. Each thermal head (30C, 30M, 30Y) is formed as a line thermal head perpendicularly extended with respect to a direction of the movement of the image-forming sheet 10.

Figure 7:
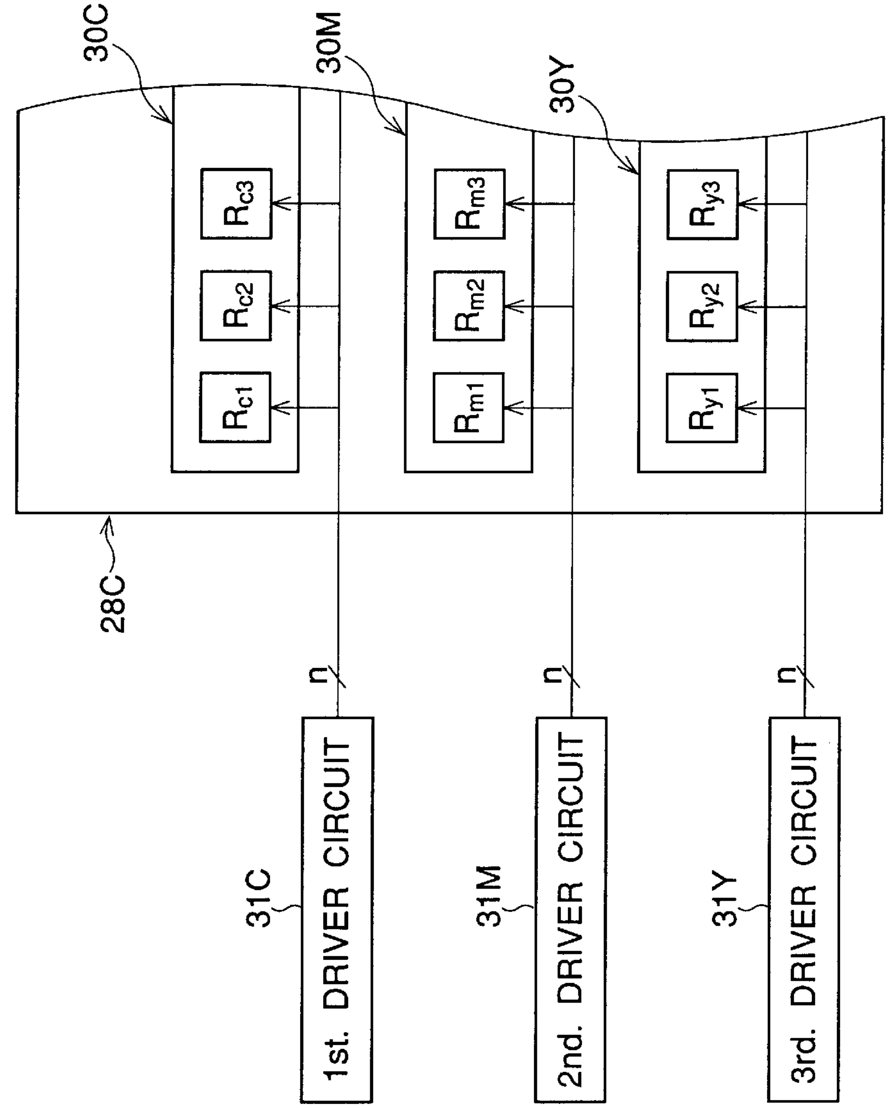
FIG. 7 is a partial schematic block diagram of three line-type thermal heads and three driver circuits therefor incorporated in the color printer of FIG. 6.

As shown in FIG. 7, the line thermal head 30C includes a plurality of heater elements or electric resistance elements $R_{c1}$ to $R_{cn}$, and these resistance elements are aligned with each other along a length of the line thermal head 30C. The electric resistance elements $R_{c1}$ to $R_{cn}$ are selectively energized by a first driver circuit 31C in accordance with a single-line of cyan image-pixel signals, and are then heated to a temperature between the glass-transition temperatures $T_1$ and $T_2$.

Also, the line thermal head 30M includes a plurality of heater elements or electric resistance elements $R_{m1}$ to $R_{m2}$ and these resistance elements are aligned with each other along a length of the line thermal head 30M. The electric resistance elements $R_{m1}$ to $R_{mn}$ are selectively energized by a second driver circuit 31M in accordance with a single-line of magenta image-pixel signals, and are then heated to a temperature between the glass-transition temperatures $T_2$ and $T_3$.

Further, the line thermal head 30Y includes a plurality of heater elements or electric resistance elements $R_{y1}$ to $R_{yn}$, and these resistance elements are aligned with each other along a length of the line thermal head 30Y. The electric resistance elements $R_{y1}$ to $R_{yn}$ are selectively energized by a third driver circuit 31Y in accordance with a single-line of yellow image-pixel signals, and are heated to a temperature between the glass-transition temperature $T_3$ and the upper limit temperature $T_{UL}$.

Namely, the line thermal heads 30C, 30M and 30Y are arranged in sequence so that the respective heating temperatures increase in the movement direction of the image-forming substrate 10.

The color printer further comprises a first roller platen 32C, a second roller platen 32M and a third roller platen 32Y associated with the first, second and third thermal heads 30C, 30M and 30Y, respectively, and each of the roller platens 32C, 32M and 32Y may be formed of a suitable hard rubber material. The first roller platen 32C is provided with a first spring-biasing unit 34C so as to be elastically pressed against the first thermal head 30C at a pressure between the critical breaking-pressure $P_3$ and the upper limit pressure $P_{UL}$; the second roller platen 32M is provided with a second spring-biasing unit 34M so as to be elastically pressed against the second thermal head 30M at a pressure between the critical breaking-pressures $P_2$ and $P_3$; and the third roller platen 32Y is provided with a third spring-biasing unit 34Y so as to be elastically pressed against the second thermal head 30Y at a pressure between the critical breaking-pressures $P_1$ and $P_2$.

Namely, the platens 32C, 32M and 32Y are arranged in sequence so that the respective pressures, exerted by the platens 32C, 32M and 32Y on the line thermal heads 30C, 30M and 30Y, decrease in the movement direction of the image-forming substrate 10.

Note, in FIG. 6, reference 36 indicates a control circuit board for controlling a printing operation of the color printer, and reference 38 indicates an electrical main power source for electrically energizing the control circuit board 36.

Figure 8:
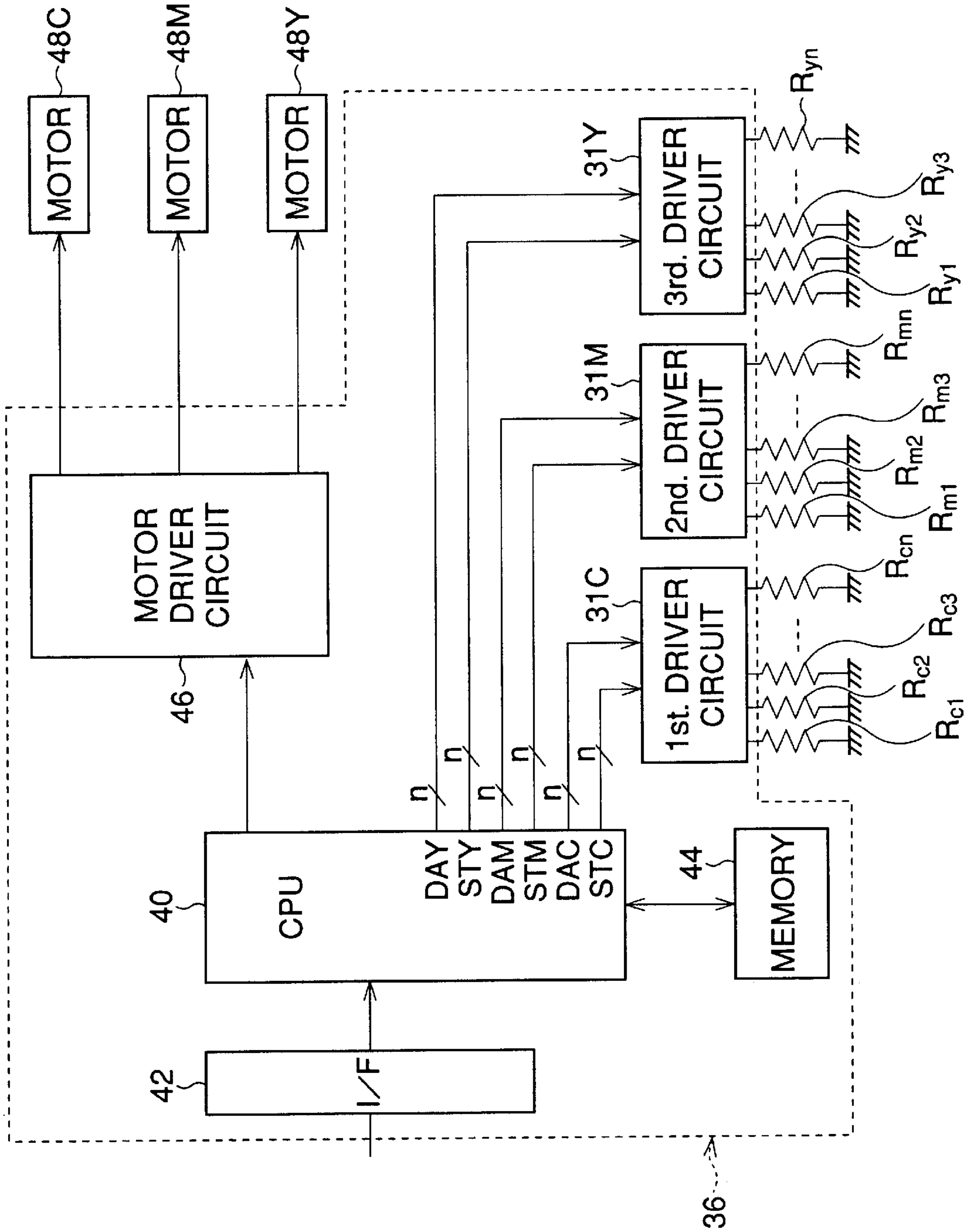
FIG. 8 is a schematic block diagram of a control board of the color printer shown in FIG. 6.

FIG. 8 shows a schematic block diagram of the control circuit board 36. As shown in this drawing, the control circuit board 36 comprises a central processing unit (CPU) 40, which receives digital color image-pixel signals from a personal computer or a word processor (not shown) through an interface circuit (I/F) 42, and the received digital color image-pixel signals, i.e. digital cyan image-pixel signals, digital magenta image-pixel signals and digital yellow image-pixel signals, are stored in a memory 44.

Also, the control circuit board 36 is provided with a motor driver circuit 46 for driving three electric motors 48C, 48M and 48Y, which are used to rotate the roller platens 32C, 32M and 32Y, respectively. In this embodiment, each of the motors 48C, 48M and 48Y is a stepping motor, which is driven in accordance with a series of drive pulses outputted from the motor driver circuit 46, the outputting of drive pulses from the motor driver circuit 46 to the motors 48C, 48M and 48Y being controlled by the CPU 40.

During a printing operation, the respective roller platens 32C, 32M and 32Y are rotated in a counterclockwise direction (FIG. 6) by the motors 48C, 48M and 48Y, respectively, with a same peripheral speed. Accordingly, the image-forming sheet 10, introduced through the entrance opening 22, moves toward the exit opening 24 along the path 26. Thus, the image-forming sheet 10 is subjected to pressure ranging between the critical breaking-pressure $P_3$ and the upper limit pressure $P_{UL}$ when passing between the first line thermal head 30C and the first roller platen 32C; the image-forming sheet 10 is subjected to pressure ranging between the critical breaking-pressures $P_2$ and $P_3$ when passing between the second line thermal head 30M and the second roller platen 32M; and the image-forming sheet 10 is subjected to pressure ranging between the critical breaking-pressures $P_1$ and $P_2$ when passing between the third line thermal head 30Y and the third roller platen 32Y.

Note, in this embodiment, the introduction of the image-forming sheet 10 into the entrance opening 22 of the printer is carried out such that the transparent protective film sheet 16 of the image-forming sheet 10 comes into contact with the thermal heads 30C, 30M and 30Y.

As is apparent from FIG. 8, the respective driver circuits 31C, 31M and 31Y for the line thermal heads 30C, 30M and 30Y are controlled by the CPU 40. Namely, the driver circuits 31C, 31M and 31Y are controlled by n sets of strobe signals "STC" and control signals "DAC", n sets of strobe signals "STW" and control signals "DAM" and n sets of strobe signals "STY" and control signals "DAY", respectively, thereby carrying out the selective energization of the electric resistance elements $R_{c1}$ to $R_{cn}$, the selective energization of the electric resistance elements $R_{m1}$ to $R_{mn}$ and the selective energization of the electric resistance elements $R_{y1}$ to $R_{yn}$, as stated in detail below.

Figure 9:
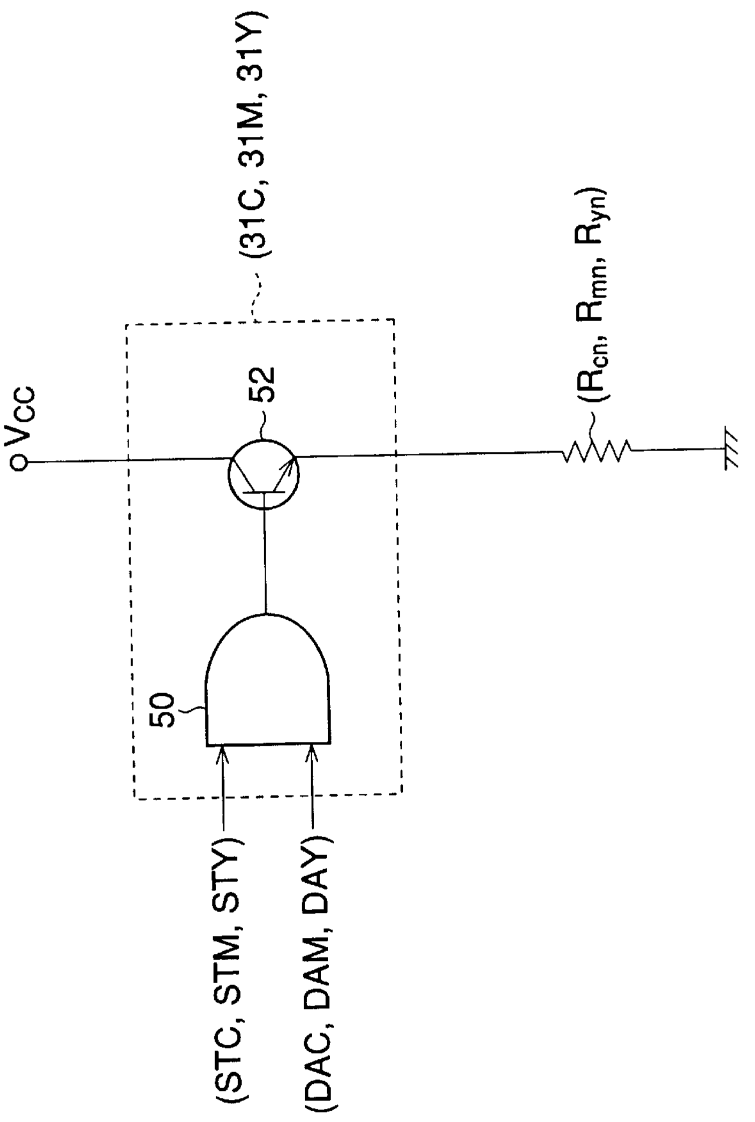
FIG. 9 is a partial block diagram representatively showing a set of an AND-gate circuit and a transistor included in each of the thermal head driver circuits of FIGS. 7 and 8.

In each driver circuit (31C, 31M and 31Y), n sets of AND-gate circuits and transistors are provided with respect to the electric resistance elements ($R_{cn}$, $R_{mn}$, $R_{yn}$) respectively. With reference to FIG. 9, an AND-gate circuit and a transistor in one set are representatively shown and indicated by references 50 and 52, respectively. A set of a strobe signal (STC, STM or STY) and a control signal (DAC, DAM or DAY) is inputted from the CPU 40 to two input terminals of the AND-gate circuit 50. A base of the transistor 52 is connected to an output terminal of the AND-gate circuit 50; a corrector of the transistor 52 is connected to an electric power source ($V_{cc}$); and an emitter of the transistor 52 is connected to a corresponding electric resistance element ($R_{cn}$, $R_{mn}$, $R_{yn}$).

Figure 10:
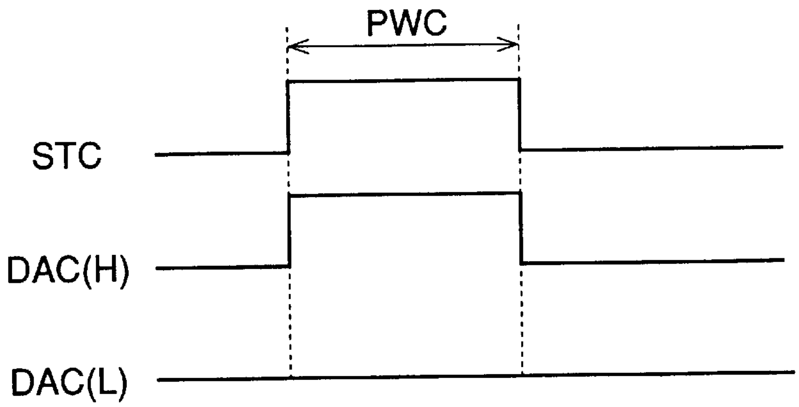
FIG. 10 is a timing chart showing a strobe signal and a control signal for electronically actuating one of the thermal head driver circuits for producing a cyan dot on the image-forming substrate of FIG. 1.

When the AND-gate circuit 50, as shown in FIG. 9, is one included in the first driver circuit 31C, a set of a strobe signal "STC" and a control signal "DAC" is inputted to the input terminals of the AND-gate circuit 50. As shown in a timing chart of FIG. 10, the strobe signal "STC" has a pulse width "PWC". On the other hand, the control signal "DAC" varies in accordance with binary values of a digital cyan image-pixel signal. Namely, when the digital cyan image-pixel signal has a value "1", the control signal "DAC" produces a high-level pulse having the same pulse width as that of the strobe signal "STC", whereas, when the digital cyan image-pixel signal has a value "0", the control signal "DAC" is maintained at a low-level.

Accordingly, only when the digital cyan image-pixel signal has the value "1", is a corresponding electric resistance element ($R_{c1}$, . . . , $R_{cn}$) electrically energized during a period corresponding to the pulse width "PWC" of the strobe signal "STC", whereby the electric resistance element concerned is heated to the temperature between the glass-transition temperatures $T_1$ and $T_2$, resulting in the production of a cyan dot on the image-forming sheet 10 due to the breakage and compacting of cyan microcapsules 18C, which are locally heated by the electric resistance element concerned.

Figure 11:
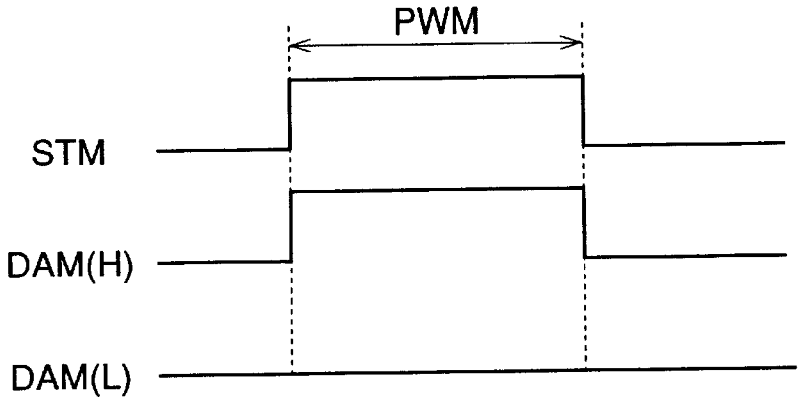
FIG. 11 is a timing chart showing a strobe signal and a control signal for electronically actuating another one of the thermal head driver circuits for producing a magenta dot on the image-forming substrate of FIG. 1.

Similarly, when the AND-gate circuit 50, as shown in FIG. 9, is one included in the second driver circuit 31M, a set of a strobe signal "STM" and a control signal "DAM" is inputted to the input terminals of the AND-gate circuit 50. As shown in a timing chart of FIG. 11, the strobe signal "STM" has a pulse width "PWM", being longer than that of the strobe signal "STC". On the other hand, the control signal "DAM" varies in accordance with binary values of a digital magenta image-pixel signal. Namely, when the digital magenta image-pixel signal has a value "1", the control signal "DAM" produces a high-level pulse having the same pulse width as that of the strobe signal "STM", whereas, when the digital magenta image-pixel signal has a value "0", the control signal "DAM" is maintained at a low-level.

Accordingly, only when the digital magenta image-pixel signal is "1", is a corresponding electric resistance element ($R_{m1}$, . . . , $R_{mn}$) electrically energized during a period corresponding to the pulse width "PWM" of the strobe signal "STM", whereby the electric resistance element concerned is heated to the temperature between the glass-transition temperatures $T_2$ and $T_3$, resulting in the production of a magenta dot on the image-forming sheet 10 due to the breakage and compacting of magenta microcapsules 18M, which are locally heated by the electric resistance element concerned.

Figure 12:
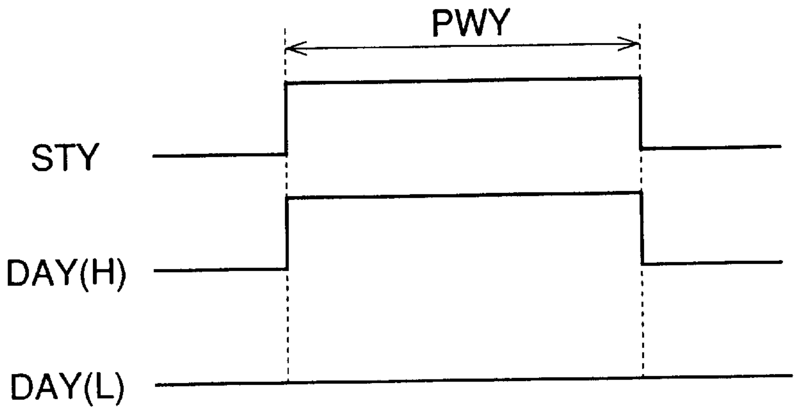
FIG. 12 is a timing chart showing a strobe signal and a control signal for electronically actuating the remaining thermal head driver circuit for producing a yellow dot on the image-forming substrate of FIG. 1.

Further, the AND-gate circuit 50, as shown in FIG. 9, is one included in the first driver circuit 31Y, a set of a strobe signal "STY" and a control signal "DAY" is inputted to the input terminals of the AND-gate circuit 50. As shown in a timing chart of FIG. 12, the strobe signal "STY" has a pulse width "PWY", being longer than that of the strobe signal "STM". On the other hand, the control signal "DAY" varies in accordance with binary values of a corresponding digital yellow image-pixel signal. Namely, when the digital yellow image-pixel signal has a value "1", the control signal "DAY" produces a high-level pulse having the same pulse width as that of the strobe signal "STY", whereas, when the digital yellow image-pixel signal has a value "0", the control signal "DAY" is maintained at a low-level.

Accordingly, only when the digital yellow image-pixel signal is "1", is a corresponding electric resistance element ($R_{y1}$, . . . , $R_{yn}$) electrically energized during a period corresponding to the pulse width "PWY" of the strobe signal "STY", whereby the resistance element concerned is heated to the temperature between the glass-transition temperature $T_3$ and the upper limit temperature $T_{UL}$, resulting in the production of a yellow dot on the image-forming sheet 10 due to the breakage and squashing of yellow microcapsules 18Y, which are locally heated by the electric resistance element concerned.

Note, the cyan, magenta and yellow dots, produced by the heated resistance elements $R_{cn}$, $R_{mn}$ and $R_{yn}$, have a dot size of about 50 $\mu$ to about 100 $\mu$, and thus three types of cyan, magenta and yellow microcapsules 18C, 18M and 1BY are uniformly included in a dot area to be produced on the image-forming sheet 10.

Of course, a color image is formed on the image-forming sheet 10 on the basis of a plurality of three-primary color dots obtained by selectively heating the electric resistance elements ($R_{c1}$ to $R_{cn}$; $R_{m1}$ to $R_{mn}$; and $R_{y1}$ to $R_{yn}$) in accordance with three-primary color digital image-pixel signals. Namely, a certain dot of the color image, formed on the image-forming sheet 10, is obtained by a combination of cyan, magenta and yellow dots produced by corresponding electric resistance elements $R_{cn}$, $R_{mn}$ and $R_{yn}$.

Figure 13:
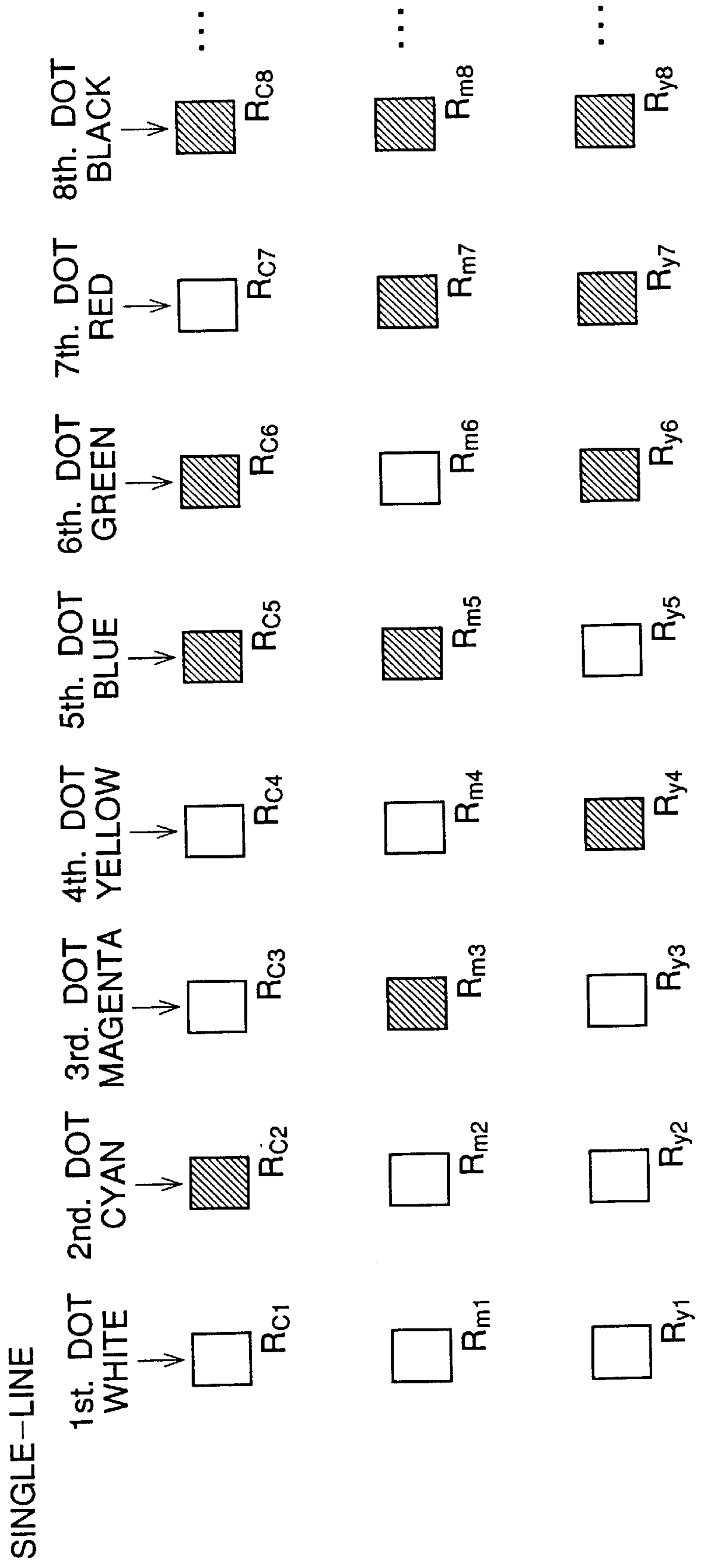
FIG. 13 is a conceptual view showing, by way of example, the production of color dots of a color image in the color printer of FIG. 6.

In particular, for example, as conceptually shown by FIG. 13, in a single-line of dots, forming a part of the color image, if a first dot is white, none of the electric resistance elements $R_{c1}$, $R_{m1}$ and $R_{y1}$ are heated. If a second dot is cyan, only the electric resistance element $R_{c2}$ is heated, and the remaining electric resistance elements $R_{m2}$ and $R_{y2}$ are not heated. If a third dot is magenta, only the resistance element $R_{m3}$ is heated, and the remaining resistance elements $R_{c3}$ and $R_{y3}$ are not heated. Similarly, if a fourth dot is yellow, only the resistance element $R_{y4}$ is heated, and the remaining resistance elements $R_{c4}$ and $R_{m4}$ are not heated.

Further, as shown in FIG. 13, if a fifth dot is blue, the electric resistance elements $R_{c5}$ and $R_{m5}$ are heated, and the remaining electric resistance element $R_{y5}$ is not heated. If a sixth dot is green, the resistance elements $R_{c6}$ and $R_{y6}$ are heated, and the remaining resistance element $R_{m6}$ is not heated. If a seventh dot is red, the resistance elements $R_{m7}$ and $R_{y7}$ are heated, and the remaining resistance element $R_{c7}$ is not heated. If an eighth dot is black, all of the resistance elements $Rc_8$, $R_{m8}$ and $R_{y8}$ are heated.

According to the first embodiment of the image-forming substrate 10, a viscosity of each of the cyan, magenta and yellow liquid dyes or inks is changed in accordance with a degree of surface roughness of the sheet of paper 12 used, such that a produced dot can be securely and finely fixed on the sheet of paper 12.

In particular, for example, when an ordinary printing paper, exhibiting a high degree of surface roughness, is used as the sheet of paper 12 in the image-forming substrate 10, each of the cyan, magenta and yellow liquid dyes or inks is prepared so as to exhibit a low viscosity, for example, 10 cp (centipoise) at a temperature at which the corresponding monochromatic microcapsules (18C, 18M, 18Y) are broken or compacted. In this case, a liquid dye or ink, which seeps out of the broken and squashed microcapsules, immediately permeates a tissue of the ordinary printing paper 12, and thus can be securely fixed on the ordinary printing paper due to the immediate permeation of the discharged liquid dye or ink into the tissue thereof. Thus, a dot can be finely and definitely produced on the ordinary printing paper 12 by the seeped liquid dye or ink.

Also, when a calendered printing paper, exhibiting an intermediate degree of surface roughness, is used as the sheet of paper 12 in the image-forming substrate 10, each of the cyan, magenta and yellow liquid dyes or inks is prepared so as to exhibit an intermediate viscosity, for example, 100 cp at a temperature at which the corresponding monochromatic microcapsules (18C, 18M, 18Y) are broken or compacted. In this case, a liquid dye or ink, which seeps out of the broken and squashed microcapsules, cannot immediately permeate a tissue of the calendered printing paper, but the discharged liquid dye or ink can be securely fixed on the calendered printing paper 12, without spreading of the seeped liquid dye or ink due to the intermediate viscosity thereof. Thus, a dot can be finely and definitely produced on the calendered printing paper 12 by the seeped liquid dye and ink.

Further, when a coated or ferrotype printing paper, exhibiting a low degree of surface roughness, is used as the sheet of paper 12 in the image-forming substrate 10, each of the cyan, magenta and yellow liquid dyes or inks is prepared so as to exhibit a high viscosity, for example, 1000 cp at a temperature at which the corresponding monochromatic microcapsules (18C, 18M, 18Y) are broken or compacted. In this case, a liquid dye or ink, which seeps out of the broken and squashed microcapsules, does not quickly permeate a tissue of the coated or ferrotype printing paper 12, but the discharged liquid dye or ink can be securely fixed on the coated or ferrotype printing paper 12, without spreading of the seeped liquid dye or ink due to the high viscosity thereof. Thus, a dot can be finely and definitely produced on the coated or ferrotype printing paper 12 by the seeped liquid dye and ink.

Figure 14:
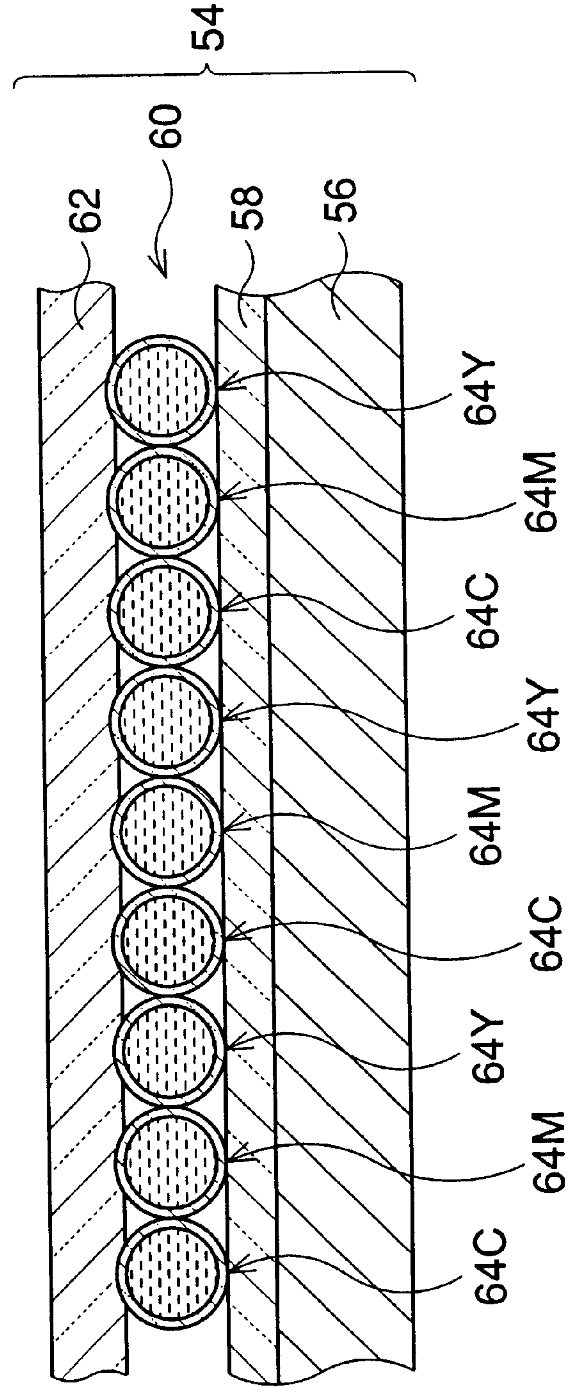
FIG. 14 is a schematic conceptual cross-sectional view showing a second embodiment of an image-forming substrate, according to the present invention, comprising a layer of microcapsules including a first type of microcapsules filled with a first transparent liquid leuco-pigment, a second type of microcapsules filled with a second transparent liquid leuco-pigment, and a third type of microcapsules filled with a third transparent liquid leuco-pigment.

FIG. 14 shows a second embodiment of an image-forming substrate, generally indicated by reference 54, according to the present invention. In this second embodiment, the image-forming substrate 54 is produced in a form of a transparent sheet. In particular, the image-forming substrate 54 comprises a sheet 56 of suitable transparent resin, a layer of transparent color developer 58 formed on a surface of the transparent sheet 56, a layer of transparent microcapsules 60 coated over a surface of the transparent color developer layer 58, and a sheet of transparent protective film 62 covering the microcapsule layer 58.

The transparent microcapsule layer 60 is formed from three types of microcapsules: a first type of microcapsules 64C filled with a first transparent liquid leuco-pigment, a second type of microcapsules 64M filled with a second transparent liquid leuco-pigment, and a third type of microcapsules 64Y filled with a third transparent liquid leuco-pigment, and the respective first, second and third liquid leuco-pigments react with the color developer, included in the color developer layer 58, to thereby produce cyan, magenta and yellow.

Similar to the first embodiment, for the resin material of each type of microcapsule (64C, 64M, 64Y), a shape memory resin is utilized, but it is transparent. Of course, the microcapsules 64C, 64M and 64Y, which are filled with leuco-pigments, are produced by one of the well-known polymerization methods mentioned above.

The microcapsules 64C, 64M and 64Y are uniformly distributed in the microcapsule layer 60. To this end, for example, similar to the first embodiment, the same amounts of cyan, magenta and yellow microcapsules 64C, 64M and 64Y are homogeneously mixed with a suitable transparent binder solution to form a suspension, and the transparent sheet 56 is coated with the binder solution, containing the suspension of microcapsules 64C, 64M and 64Y, by using an atomizer. Also, similar to FIG. 1, in FIG. 14, for the convenience of illustration, although the microcapsule layer 60 is shown as having a thickness corresponding to the diameter of the microcapsules 64C, 64M and 64Y, in reality, the three types of microcapsules 64C, 64M and 64Y overlay each other, and thus the microcapsule layer 60 has a larger thickness than the diameter of a single microcapsule 64C, 64M or 64Y.

Figure 15:
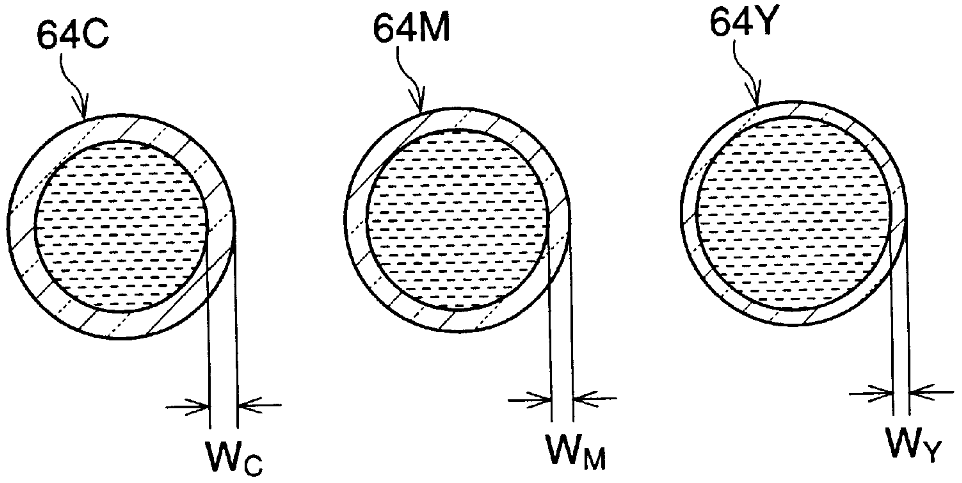
FIG. 15 is a schematic cross-sectional view showing different shell wall thicknesses of the respective first, second and third types of microcapsules shown in FIG. 14.

Further, similar to the first embodiment, the cyan microcapsules 64C, magenta microcapsules 64M, and yellow microcapsules 64Y, respectively, have differing thicknesses $W_C$, $W_M$ and $W_Y$ as shown in FIG. 15. Namely, the thickness $W_C$ of cyan microcapsules 64C is larger than the thickness $W_M$ of magenta microcapsules 64M, and the thickness $W_M$ of magenta microcapsules 64M is larger than the thickness $W_Y$ of yellow microcapsules 64Y.

Accordingly, the respective microcapsules 64C, 64M and 64Y also exhibit the temperature/pressure characteristics, as shown in FIG. 3. Namely, by suitably selecting a heating temperature and a breaking pressure, which should be exerted on the image-forming substrate 54, it is possible to selectively break and squash the cyan, magenta and yellow microcapsules 64C, 64M and 64Y, and thus a color image can be formed on the image-forming substrate 54 by the thermal color printer as shown in FIG. 6.

Especially, the second embodiment of the transparency image-forming substrate, according to the present invention, can be advantageously utilized to produce a transparency film for a well-known overhead projector (OHP). Namely, when a color image is formed on the image-forming substrate 54, it is possible to directly use this transparency-type substrate 54, carrying the color image, as a transparency film for the overhead projector.

Figure 16:
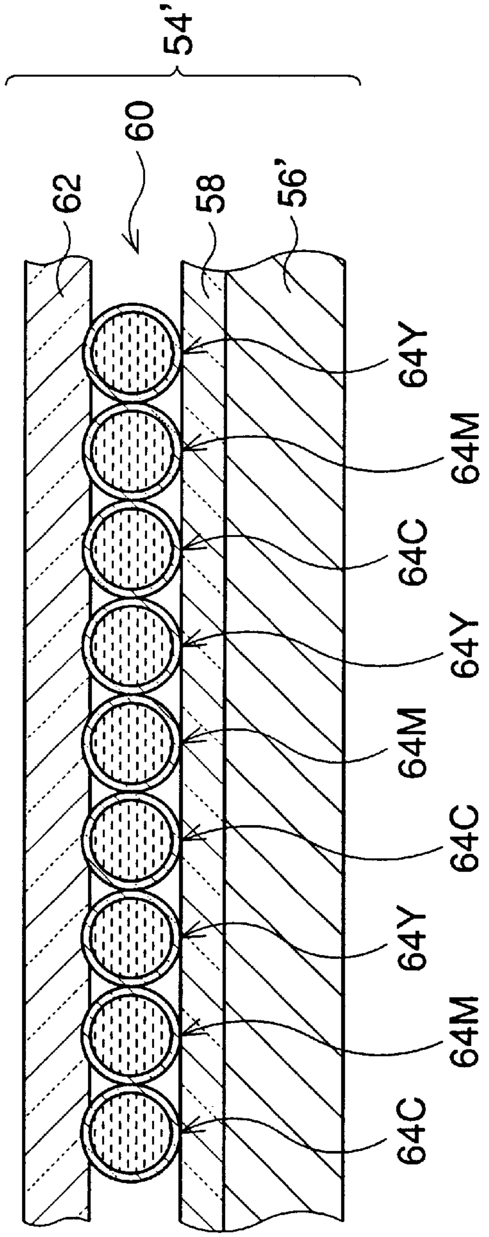
FIG. 16 is a schematic conceptual cross-sectional view similar to FIG. 14, showing a modification of the second embodiment of the image-forming substrate, according to the present invention.

FIG. 16 shows a modification of the second embodiment of the image-forming substrate, generally indicated by reference 54', according to the present invention. In the modified image-forming substrate 54', a sheet of paper 56' is substituted for the transparent sheet 56, and thus the image-forming substrate 54' cannot be utilized to produce a transparency film for the overhead projector. Nevertheless, the image-forming substrate 54' is useful and advantageous in view of another aspect.

In particular, when a monochromatic dye or ink is encapsulated in a microcapsule as the case of the first embodiment, a shell of the microcapsule cannot be transparent.

Namely, the microcapsule shell must be colored with the same single color pigment as a color (usually, white) of the sheet of paper 56'. In this case, when the microcapsule is broken or compacted, so that a single color is exhibited due to a seepage of the monochromatic dye or ink from the broken and compacted microcapsule, the exhibited single color may be influenced by the single color pigment of the shell of the broken and compacted microcapsule, because the shell of the broken and compacted microcapsule cannot necessarily be completely hidden by the seeped monochromatic dye or ink, as shown by way of example in FIG. 5. For example, when the single color pigment of the microcapsule shell is white, the exhibited single color is thinned.

Nevertheless, in the modified embodiment shown in FIG. 16, although a liquid leuco-pigment, seeped from a broken and compacted microcapsule (64C, 64M, 64Y), reacts with the color developer to thereby produce a single color, this produced single color cannot be influenced by the transparent shell of the broken and compacted microcapsule (64C, 64M, 64Y).

In the embodiments shown in FIGS. 14 and 16, the transparent binder solution may contain the transparent color developer which reacts on the first, second and third transparent liquid leuco-pigments to produce cyan, magenta and yellow. Also, when a sufficient amount of transparent color can be contained in the transparent binder solution, the transparent color developer layer 58 may be omitted from the image-forming substrate (54, 54').

Figure 17:
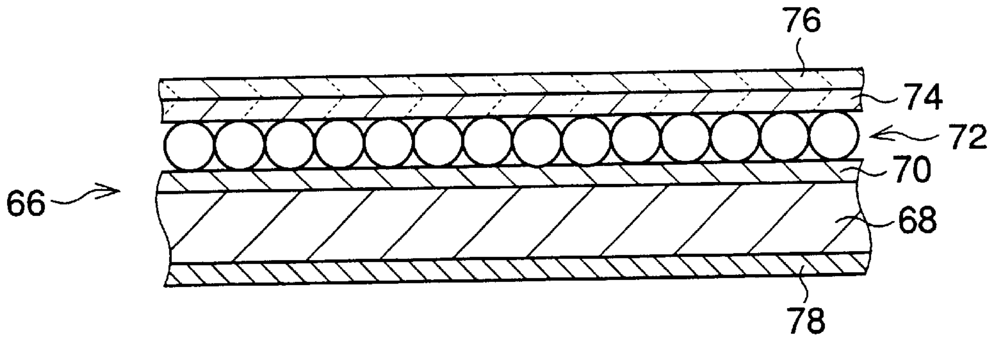
FIG. 17 is a schematic conceptual cross-sectional view showing a third embodiment of an image-forming substrate, according to the present invention.

FIG. 17 shows a third embodiment of an image-forming substrate, generally indicated by reference 66, according to the present invention. Similar to the first embodiment, the image-forming substrate 66 is produced in a form of paper sheet. Namely, the image-forming substrate 66 comprises a sheet of paper 68, a white-coat layer 70 formed on a surface of the paper sheet 68, a layer of microcapsules 72 coated over a surface of the white-coat layer 70, a sheet of transparent ultraviolet barrier film 74 covering the microcapsule layer 72, and a sheet of transparent protective film 76 applied to the transparent ultraviolet barrier film 74.

The white-coat layer 70 is composed of a suitable white-pigment, and gives a desired white quality to the surface of the paper sheet 68. The microcapsule layer 72 may be identical to the microcapsule layer 14 of the first embodiment shown in FIG. 1. Namely, the cyan, magenta and yellow microcapsules, included in the microcapsule layer 72, exhibit the temperature/pressure characteristics as shown in FIG. 3. Accordingly, by suitably selecting a heating temperature and a breaking pressure, which should be exerted on the image-forming substrate 66, the cyan, magenta and yellow microcapsules can be selectively broken and squashed, and thus a color image can be formed on the image-forming substrate 66 by the thermal color printer as shown in FIG. 6.

Also, in the third embodiment, it is possible to considerably improve a preservation of a color image, formed on the image-forming substrate 66, due to the existence of the ultraviolet barrier film sheet 74. Namely, by the ultraviolet barrier film sheet 74, the formed color image can be prevented from deteriorating due to ultraviolet light. While the color image is formed on the image-forming substrate 66 by the thermal printer shown in FIG. 6, the ultraviolet barrier film sheet 74 may be thermally fused by the thermal heads (30C, 30M and 30Y). Nevertheless, due to the existence of the protective film sheet 76, the thermally-fused ultraviolet barrier film sheet 74 is prevented from being stuck to the thermal heads.

Further, in the third embodiment, the image-forming substrate 66 features an electrical conductive layer 78 formed on the other surface or back surface of the paper sheet 68, and the electrical conductive layer 78 may be composed of a suitable electrical conductive coating material. In general, an image-forming substrate is susceptible to an electrical charge due to triboelectrification, and the electrically-charged image-forming substrate may be entangled by a platen (32C, 32M, 32Y), due to the generation of an electrostatic attractive force between the platen and the charged image-forming substrate during a formation of a color image by the printer shown in FIG. 6. Nevertheless, in the third embodiment, the electrostatic entanglement of the image-forming substrate 66 by a platen can be prevented due to the existence of the electrical conductive layer 78.

In particular, although the image-forming substrate 66 is electrostatically charged, the electrostatic charge can be easily dissipated from the image-forming substrate 66 through the electrical conductive layer 78, during the formation of the color image by the printer, because the electrical conductive layer 78 can be in electrical contact with a conductive part of the printer.

In the third embodiment, a leuco-pigment may be utilized. In this case, a color developer, which reacts with the leuco-pigment, may be contained in a binder solution, which is used for the formation of the microcapsule layer 72. Optionally, the color developer may be contained in the white-coat layer 70.

Figure 18:
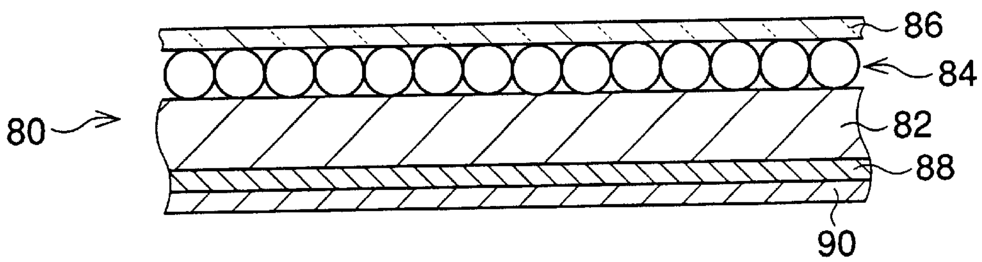
FIG. 18 is a schematic conceptual cross sectional view showing a fourth embodiment of an image-forming substrate, according to the present invention.

FIG. 18 shows a fourth embodiment of an image-forming substrate, generally indicated by reference 80, according to the present invention. In this fourth embodiment, the image forming substrate 80 is produced in a form of a seal sheet, a piece of which may be utilized as a seal adapted to be adhered to a post card, an envelop, a package or the like. Namely, the image-forming substrate 80 comprises a sheet of paper 82, a layer of microcapsules 84 coated over a surface of the paper sheet 82, a sheet of transparent protective film 86 covering the microcapsule layer 84, a layer of adhesive 88 formed on the other surface of the paper sheet 82, and a sheet of release paper 90 applied to the adhesive layer 88.

The microcapsule layer 84 may be identical to the microcapsule layer 14 of the first embodiment shown in FIG. 1. Namely, the cyan, magenta and yellow microcapsules, included in the microcapsule layer 84, exhibit the temperature/pressure characteristics as shown in FIG. 3. Accordingly, by suitably selecting a heating temperature and a breaking pressure, which should be exerted on the image-forming substrate 80, the cyan, magenta and yellow microcapsules can be selectively broken and squashed, and thus a color image can be formed on the image-forming substrate 80 by the thermal color printer as shown in FIG. 6.

Preferably, the image-forming substrate 80 is provided with crosswise perforated lines (not shown) so as to enable division into a plurality of rectangular sections, and respective identical or different images are formed on the rectangular sections of the image-forming substrate 80. Thereafter, one of the rectangular sections is cut off from the image-forming substrate 80, and a piece of the release paper sheet 90 is peeled therefrom, whereby the rectangular section concerned can be adhered to a post card, an envelop, a package, or the like.

Similar to the third embodiment, in the fourth embodiment, a leuco-pigment may be utilized as an ink to be encapsulated in the microcapsules. In this case, a color developer, which reacts with the leuco-pigment, may be contained in a binder solution, which is used for the formation of the microcapsule layer 84. Optionally, a layer of color developer may be interposed between the paper sheet 82 and the microcapsule layer 84.

Figure 19:
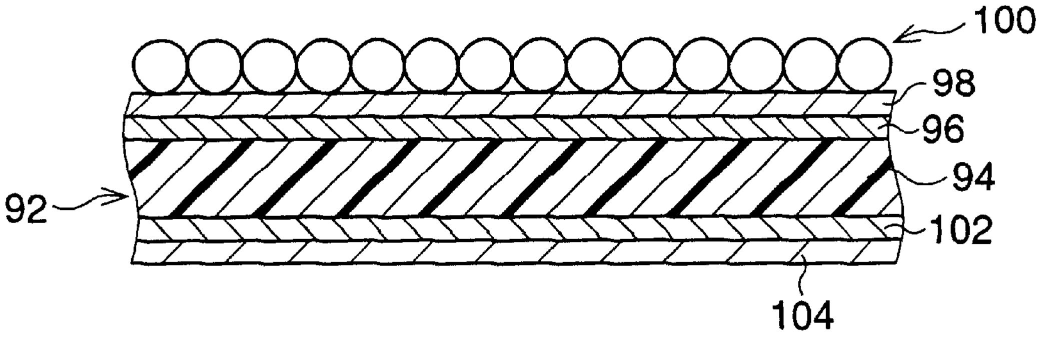
FIG. 19 is a schematic conceptual cross-sectional view showing a fifth embodiment of an image-forming substrate, according to the present invention.

FIG. 19 shows a fifth embodiment of an image-forming substrate, generally indicated by reference 92, according to the present invention. In this fifth embodiment, the image-forming substrate 92 is produced in a form of a transfer film sheet. Namely, the image-forming substrate 92 comprises a sheet of film 94 composed of a suitable synthetic resin, such as polyethylene terephthalate, a peeling layer 96 composed of a teflon-based coating material or a silicone-based coating material and formed over a surface of the film sheet 94, a layer of a transparent ultraviolet barrier 98 formed on the peeling layer 96, and a layer of microcapsules 100 coated over the ultraviolet barrier layer 98.

The microcapsule layer 100 may be identical to the microcapsule layer 14 of the first embodiment shown in FIG. 1. Namely, the cyan, magenta and yellow microcapsules, included in the microcapsule layer 100, have the temperature/pressure characteristics, as shown in FIG. 3. Accordingly, by suitably selecting a heating temperature and a breaking pressure, which should be exerted on the image-forming substrate 92, the cyan, magenta and yellow microcapsules can be selectively broken and squashed, and thus a color image can be formed on the image-forming substrate 92 by the thermal color printer as shown in FIG. 6.

Further, the image-forming substrate 92 may optionally comprise an electrical conductive layer 102 formed on the other surface or back surface of the film sheet 94, and a sheet of protective film 104 is applied to the electrical conductive layer 102.

Figure 20:
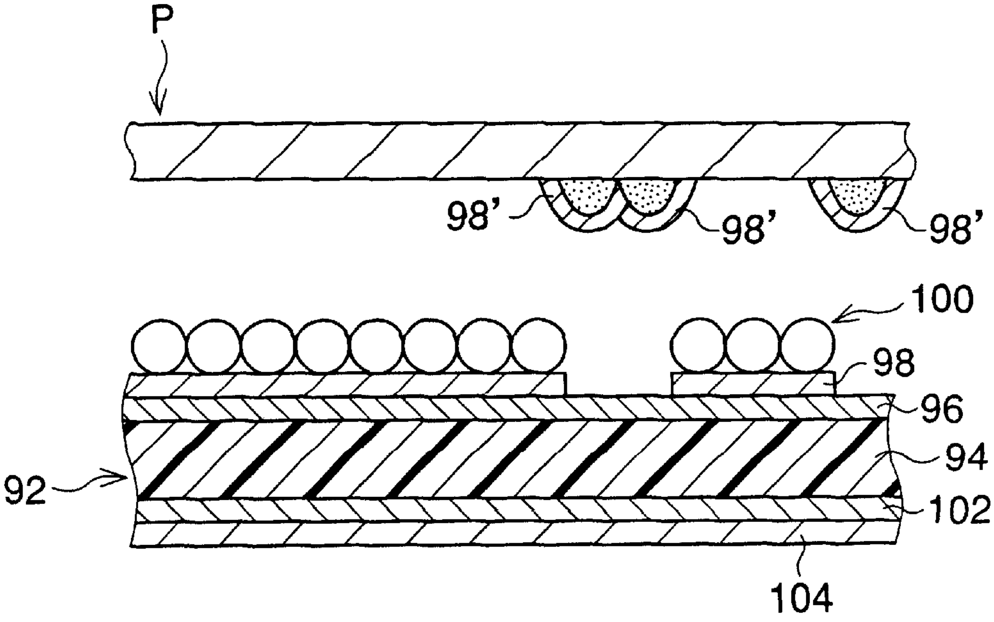
FIG. 20 is a schematic conceptual cross-sectional view similar to FIG. 19, showing the image-forming substrate together with a printing sheet of paper to which a color image should be transferred from the image-forming substrate of FIG. 19.

As shown in FIG. 20, the image-forming substrate 92 is used together with a printing sheet of paper P. Namely, the image-forming substrate 92, overlaid with the printing paper sheet P, is fed in the printer as shown in FIG. 6, such that the protective film sheet 104 contacts the thermal heads (30C, 30M and 30Y), and the cyan, magenta and yellow microcapsules are selectively broken and squashed in accordance with respective digital color image-pixel signals. Thus, as conceptually shown in FIG. 20, ink, seeped from the broken and squashed microcapsule, is transferred from the image-forming substrate 92 to the printing paper sheet P,. Namely, a color image is once formed on the image-forming substrate 92, and then the formed color image is transferred to the printing paper sheet P.

On the other hand, when the image-forming substrate 92 is heated by the thermal heads (30C, 30M and 30Y), the transparent ultraviolet barrier layer 98 is thermally fused locally in accordance with the digital color image-pixel signal. Thus, as shown in FIG. 20, the ink, transferred from the image-forming substrate 92 to the printing sheet paper P, is covered with a thermally-fused transparent ultraviolet barrier material 98 ', derived from the transparent ultraviolet barrier layer 98 which separates from the film sheet 94 due to the existence of the peeling layer 96. Accordingly, it is possible to considerably improve the preservation of a transferred color image, formed on the printing paper sheet P, due to the existence of the thermally-fused transparent ultraviolet barrier material 98'.

Similar to the third embodiment, in the fifth embodiment, during a formation of a color image on the printing sheet paper P by the printer shown in FIG. 6, an electrostatic entanglement of the image-forming substrate 92 by a platen can be prevented due to the existence of the electrical conductive layer 102. Namely, during the formation of the color image by the printer, a side edge of the image-forming substrate 92 is in contact with a grounded conductive element of the printer (not shown in FIG. 6), whereby an electrostatic charge can be easily dissipated from the image-forming substrate 92 through the electrical conductive layer 102. Also, during the formation of the color image by the printer, although the electrical conductive layer 102 may be thermally fused by the thermal heads (30C, 30M, 30Y), the thermally-fused electrical conductive layer 102 is prevented from being stuck to the thermal heads, due to the existence of the protective film sheet 104.

Figure 21:
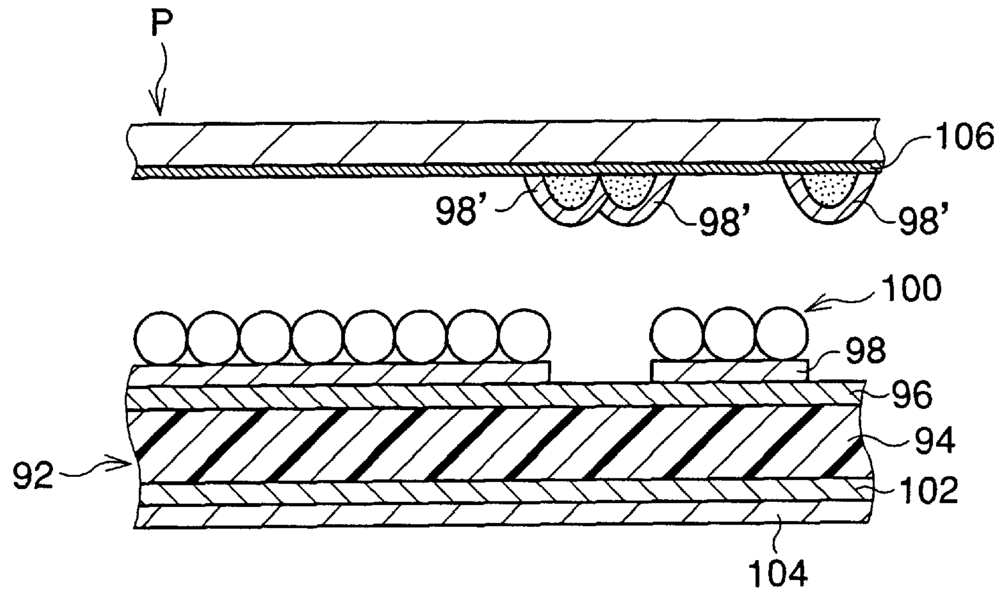
FIG. 21 is a schematic conceptual cross-sectional view similar to FIG. 20, showing a modification of the fifth embodiment of the image-forming substrate shown in FIG. 19.

In the fifth embodiment, optionally, as an ink to be encapsulated in the microcapsules, a leuco-pigment may be utilized. In this case, as shown in FIG. 21, a layer of color developer 106 is formed over the paper sheet P.

Figure 22:
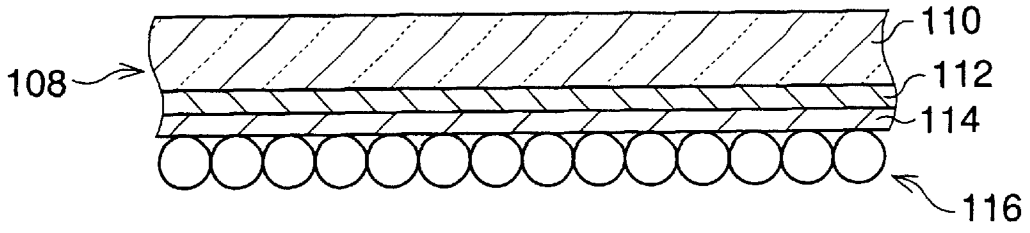
FIG. 22 is a schematic conceptual cross-sectional view showing a sixth embodiment of an image-forming substrate, according to the present invention.

FIG. 22 shows a sixth embodiment of an image-forming substrate, generally indicated by reference 108, according to the present invention. In this six embodiment, the image-forming substrate 108 is also produced in a form of a transfer film sheet. Namely, the image-forming substrate 108 comprises a sheet of transparent film 110 composed of a suitable synthetic resin, such as polyethylene terephthalate, a transparent peeling layer 112 composed of a teflon-based coating material or a silicone-based coating material and formed over a surface of the film sheet 110, a layer of transparent ultraviolet barrier 114, and a layer of microcapsules 116 coated over the ultraviolet barrier layer 114.

The microcapsule layer 116 may be identical to the microcapsule layer 14 of the first embodiment shown in FIG. 1, except that a shell of the cyan, magenta and yellow microcapsules is formed of a transparent shape memory resin. Namely, the cyan, magenta and yellow microcapsules, included in the microcapsule layer 114, have the temperature/pressure characteristics as shown in FIG. 3. Accordingly, by suitably selecting a heating temperature and a breaking pressure, which should be exerted on the image-forming substrate 108, the cyan, magenta and yellow microcapsules can be selectively broken and squashed, and thus a color image can be formed on the image-forming substrate 108 by the thermal color printer as shown in FIG. 6.

Figure 23:
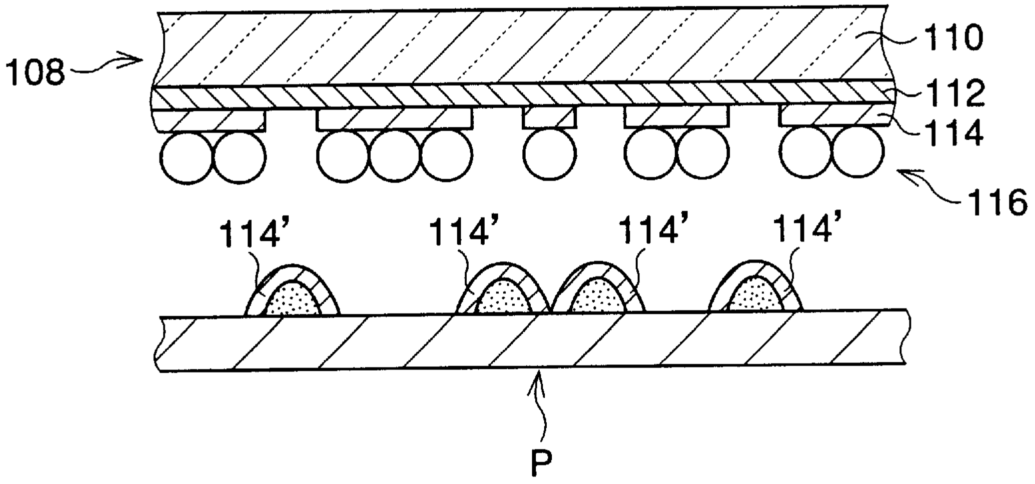
FIG. 23 is a schematic conceptual cross-sectional view similar to FIG. 22, showing the image-forming substrate together with a printing sheet of paper to which a color image should be transferred from the image-forming substrate of FIG. 22.

As shown in FIG. 23, the image-forming substrate 108 is used together with a printing sheet of paper P. Namely, the image-forming substrate 108, overlaid with the printing paper sheet P, is fed in the printer, as shown in FIG. 6, such that the printing paper sheet P contacts the thermal heads (30C, 30M and 30Y), and the cyan, magenta and yellow microcapsules are selectively broken and squashed in accordance with respective digital color image-pixel signals. Thus, as conceptually shown in FIG. 24, ink, discharged from the broken and squashed microcapsules, is transferred from the image-forming substrate 108 to the printing paper sheet P. Namely, a color image is once formed on the image-forming substrate 108, and then the formed color image is transferred to the printing paper sheet P.

Similar to the fifth embodiment, in this six embodiment, when the image-forming substrate 108 is heated by the thermal heads (30C, 30M, 30Y), the transparent ultraviolet barrier layer 114 is thermally fused locally in accordance with the digital color image-pixel signal. Thus, as shown in FIG. 23, the ink, transferred from the image-forming substrate 108 to the printing sheet paper P, is covered with a thermally-fused transparent ultraviolet barrier material 114', derived from the transparent ultraviolet barrier layer 114 which separates from the film sheet 110 due to the existence of the peeling layer 112. Accordingly, it is possible to considerably improve a preservation of a transferred color image, formed on the printing paper sheet P, due to the existence of the thermally-fused transparent ultraviolet barrier material 114'.

According to the sixth embodiment, after a frame of color image is completely transferred to the printing paper sheet P, the remaining image-forming substrate 108 can be utilized as a transparency film carrying a frame of negative color image, due to the transparent film sheet 110 and the transparent shells of the cyan, magenta and yellow microcapsules included in the microcapsule layer 116.

Figure 24:
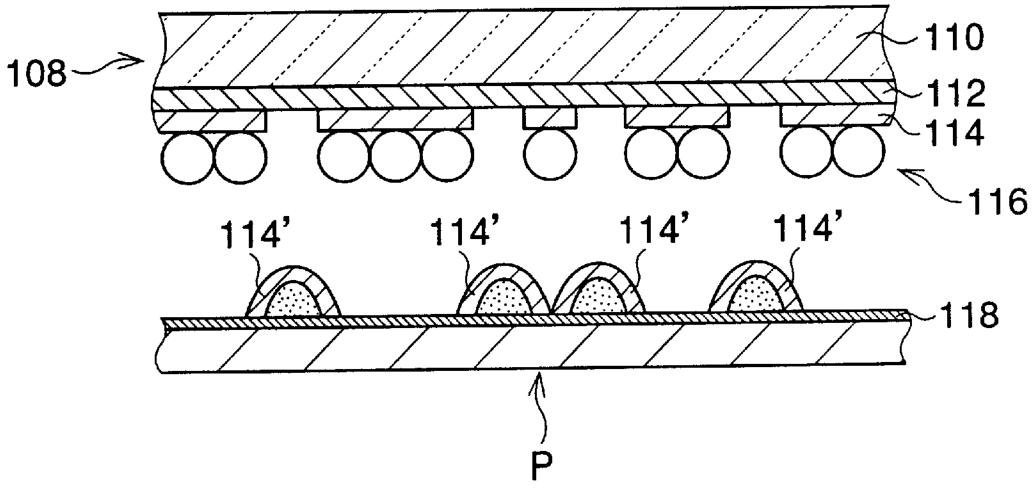
FIG. 24 is a schematic conceptual cross-sectional view similar to FIG. 23, showing a modification of the sixth embodiment of the image-forming substrate shown in FIG. 22.

On the other hand, in the sixth embodiment, as an ink to be encapsulated in the microcapsules, a transparent leuco-pigment may be utilized. In this case, as shown in FIG. 24, a layer of color developer 118 is be formed over the paper sheet P. Of course, in the embodiment of FIG. 24, after a frame of color image is completely transferred to the printing paper sheet P, the remaining image-forming substrate 108 cannot be utilized as a transparency film carrying a frame of a negative color image, because the leoco-pigments, encapsulated in the microcapsules, are transparent. Nevertheless, the remaining transparent image-forming sheet 108 can be recycled for a certain purpose due to the transparency characteristic thereof. For example, the remaining transparent image-forming substrate 108 can be used as a wrapping sheet.

Figure 25:
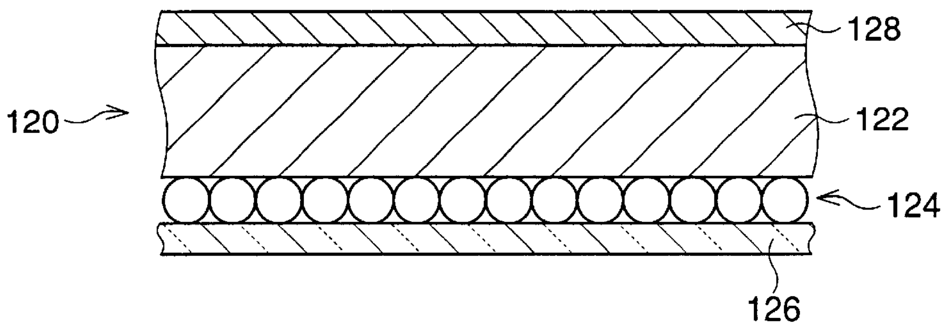
FIG. 25 is a schematic conceptual cross-sectional view showing a seventh embodiment of an image-forming substrate, according to the present invention.

FIG. 25 shows a seventh embodiment of an image-forming substrate, generally indicated by reference 120, according to the present invention. In this seventh embodiment, the image-forming substrate 120 is produced in a form of a board paper sheet, which may be advantageously utilized as a post card. Namely, the image-forming substrate 120 comprises a sheet of board paper 122, a layer of microcapsules 124 coated over a surface of the board paper sheet 122, and a sheet of transparent protective film 126 covering the microcapsule layer 124.

The microcapsule layer 124 may be identical to the microcapsule layer 14 of the first embodiment shown in FIG. 1. Namely, the cyan, magenta and yellow microcapsules, included in the microcapsule layer 124, have the temperature/pressure characteristics as shown in FIG. 3. Accordingly, by suitably selecting a heating temperature and a breaking pressure, which should be exerted on the image-forming substrate 120, the cyan, magenta and yellow microcapsules can be selectively broken and squashed, and thus a color image can be formed on the image-forming substrate 120 by the thermal color printer as shown in FIG. 6. Note, of course, the spring-biasing units (34C, 34M and 34Y) are adjustable in accordance with a thickness of the image-forming substrate 120, such that the platens (32C, 32M, 32Y) can be elastically pressed against the thermal heads (30C, 30M, 30Y) at the required predetermined pressures.

Further, in the seventh embodiment, the image-forming substrate 120 features a heat-sensitive recording layer 128 formed on the other surface of the board paper sheet 122. The heat-sensitive recording layer 128 per se is well known. Namely, the heat-sensitive recording layer 128, which usually exhibits a white surface, is changed into a black surface when the heat-sensitive recording layer 128 is heated to beyond a predetermined temperature.

Accordingly, when the image-forming substrate 120 is fed in the printer, as shown in FIG. 6, such that the transparent protective film contacts the thermal heads (30C, 30M and 30Y), the cyan, magenta and yellow microcapsules are selectively broken and squashed in accordance with respective digital color image-pixel signals, whereby a color image is formed on the microcapsule layer 124 of the image-forming substrate 120.

On the other hand, by operating one of the thermal heads (30C, 30M and 30Y) of the printer, black images, such as black characters, can be formed and recorded on the heat-sensitive recording layer 128 of the image-forming substrate 120. Of course, in this case, the image-forming substrate 120 is fed in the printer, such that the heat-sensitive recording layer 128 contacts the thermal heads (30C, 30M and 30Y).

Note, during the formation of the color image on the microcapsule layer 124 of the image-forming substrate 120 by the thermal heads (30C, 30M and 30Y), the heat-sensitive recording layer 128 cannot be thermally influenced by the thermal heads, due to a sufficient thickness of the board paper sheet 122. Of course, the reverse is true for the microcapsule layer 124 when forming an image on the heat-sensitive recording layer 128.

Similar to the fourth embodiment, in the seventh embodiment, a leuco-pigment may be utilized as an ink to be encapsulated in the microcapsules. In this case, a color developer, which reacts with the leuco-pigment, may be contained in a binder solution, which is used for the formation of the microcapsule layer 124. Optionally, a layer of color developer may be interposed between the board paper sheet 122 and the microcapsule layer 124.

Figure 26:
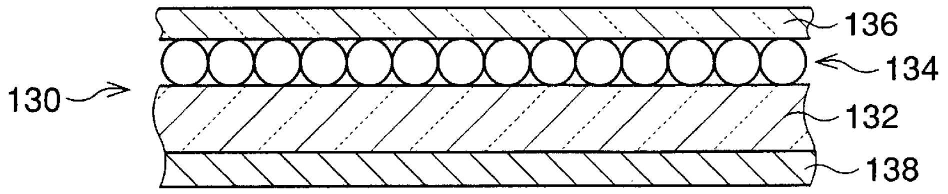
FIG. 26 is a schematic conceptual cross-sectional view showing an eighth embodiment of an image-forming substrate, according to the present invention.

FIG. 26 shows an eighth embodiment of an image-forming substrate, generally indicated by reference 130, according to the present invention. In this eighth embodiment, the image-forming substrate 130 is produced in a form of a paper sheet. Namely, the image-forming substrate 130 comprises a sheet of suitable transparent resin 132, a layer of microcapsules 134 coated over a surface of the transparent resin sheet 132, and a sheet of transparent protective film 136 covering the microcapsule layer 134.

The microcapsule layer 134 may be identical to the microcapsule layer 14 of the first embodiment shown in FIG. 1. Namely, the cyan, magenta and yellow microcapsules, included in the microcapsule layer 134, have the temperature/pressure characteristics as shown in FIG. 3. Accordingly, by suitably selecting a heating temperature and a breaking pressure, which should be exerted on the image-forming substrate 130, the cyan, magenta and yellow microcapsules can be selectively broken and squashed, and thus a color image can be formed on the image-forming substrate 130 by the thermal color printer as shown in FIG. 6.

Further, in the eighth embodiment, the image-forming substrate 130 features a heat-sensitive recording layer 138 formed on the other surface of the transparent resin sheet 132. The heat-sensitive recording layer 138 is identical to the heat-sensitive recording layer 128 of the seventh embodiment. Namely, the heat-sensitive recording layer 138 usually exhibits a white surface, but the white surface is changed into a black surface when the heat-sensitive recording layer 138 is heated to beyond a predetermined temperature, as indicated by the reference $T_{UL}$ of FIG. 3.

As is apparent from the description made accompanying FIG. 13, a dot area, in which a black dot should be produced on the microcapsule layer 134, is successively heated by three resistance elements ($R_{cn}$, $R_{mn}$ and $R_{yn}$) of the thermal heads (30C, 30M, 30Y), which correspond to each other.

Thus, a temperature of the above-mentioned dot area exceeds the predetermined temperature ($T_{UL}$), due to the successive heating by the three resistance elements ($R_{cn}$, $R_{mn}$ and $R_{yn}$). Accordingly, a white area of the heat-sensitive recording layer 138, corresponding to the black dot produced on the microcapsule layer 134 is thermally changed into a black area.

As is well known, it is possible to produce black by mixing the three primary-colors: cyan, magenta and yellow, but, in reality, it is difficult to generate a true or vivid black by the mixing of the primary colors. Nevertheless, according to the eighth embodiment, it is possible to easily obtain a suitable black, due to the existence of the heat-sensitive recording layer 138.

Similar to the fourth embodiment, in the eighth embodiment, a leuco-pigment may be utilized as an ink to be encapsulated in the microcapsules. In this case, a transparent color developer, which reacts with the leuco-pigment, may be contained in a binder solution, which is used for the formation of the microcapsule layer 134. Optionally, a layer of transparent color developer may be interposed between the transparent resin sheet 132 and the microcapsule layer 134.

Figure 27:
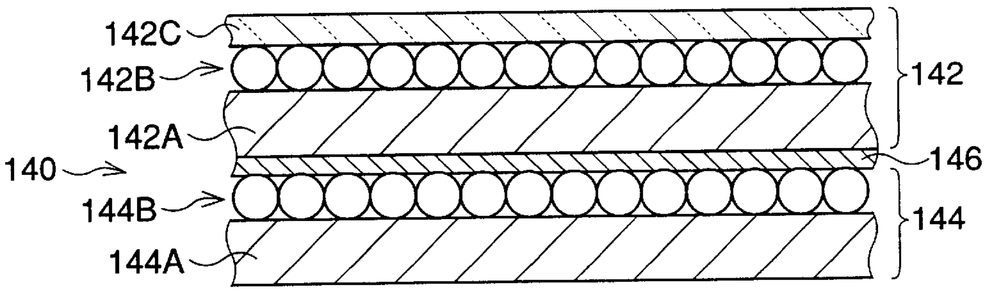
FIG. 27 is a schematic conceptual cross-sectional view showing a ninth embodiment of an image-forming substrate, according to the present invention.

FIG. 27 shows a ninth embodiment of an image-forming substrate, generally indicated by reference 140, according to the present invention. In this ninth embodiment, the image-forming substrate 140 is produced in a form of a duplicating-paper sheet or a double-recording-paper sheet. Namely, the image-forming substrate 140 comprises a first image-forming substrate element 142, a second image-forming substrate element 144, and a peeling layer 146 interposed between the first and second image-forming substrate elements 142 and 144, which is composed of a teflon-based coating material or a silicone-based coating material.

Figure 29:
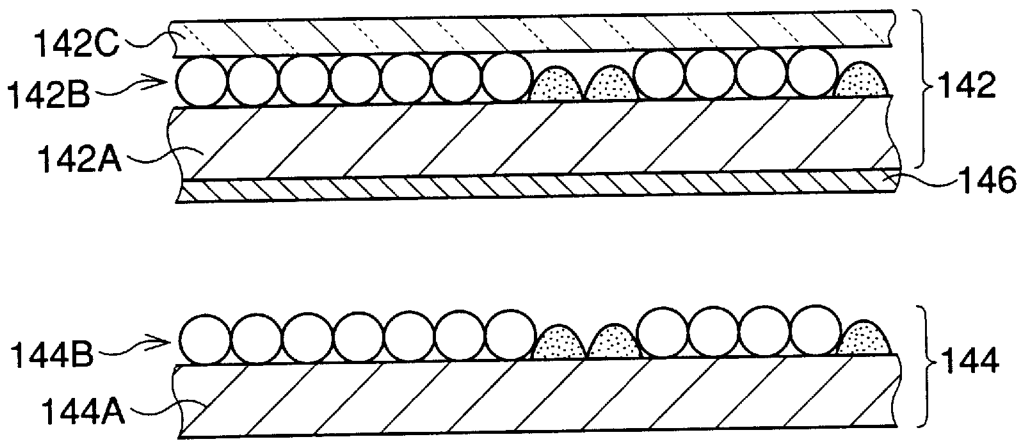
FIG. 29 is a schematic conceptual cross-sectional view showing the ninth embodiment of the image-forming substrate of FIG. 27 at an aspect different from that of FIG. 27.

In particular, the first image-forming substrate element 142 includes a first sheet of paper 142A, a first layer of microcapsules 142B coated over a surface of the first paper sheet 142A, and a sheet of transparent protective film 142C covering the first microcapsule layer 142B, and the second image forming substrate element 144 includes a second sheet of paper 144A and a second layer of microcapsules 144B coated over a surface of the second paper sheet 144A. The peeling layer 146 is provided between the other surface of the first paper sheet 142A and the second microcapsule layer 144B, as shown in FIG. 29, and is formed on and adhered to the other surface of the first paper sheet 142A with a larger adhesive force than that between the second microcapsule layer 144B and the peeling layer 146. Namely, the second image-forming substrate element 144 can be easily peeled from the peeling layer 146 when the image-forming substrate 140 is separated into the two substrate elements 142 and 144.

In the ninth embodiment, the first microcapsule layer 142B is substantially identical to the microcapsule layer 14 of the first embodiment shown in FIG. 1. Namely, the cyan, magenta and yellow microcapsules, included in the first microcapsule layer 142B, exhibit the temperature/pressure characteristics as shown in FIG. 3. Accordingly, by suitably selecting a heating temperature and a breaking pressure, which should be exerted on the first image-forming substrate element 142, the cyan, magenta and yellow microcapsules can be selectively broken and squashed, and thus a color image can be formed on the first image-forming substrate element 142.

Similar to the microcapsule layer 14 of the first embodiment, shown in FIG. 1, the second microcapsule layer 144B is formed from three types of microcapsules: a first type of microcapsules filled with cyan liquid dye or ink, a second type of microcapsules filled with magenta liquid dye or ink, and a third type of microcapsules filled with yellow liquid dye or ink, and these three types of microcapsules are uniformly distributed in the second microcapsule layer 144B. The respective cyan, magenta and yellow microcapsules, included in the second microcapsule layer 144B, exhibit temperature/pressure characteristics, indicated by a solid line, a single-chained line and a double-chained line in FIG. 28. Accordingly, by suitably selecting a heating temperature and a breaking pressure, which should be exerted on the second image-forming substrate element 144, the cyan, magenta and yellow microcapsules can be selectively broken and squashed, and thus a color image can be formed on the second image-forming substrate element 144.

Figure 28:
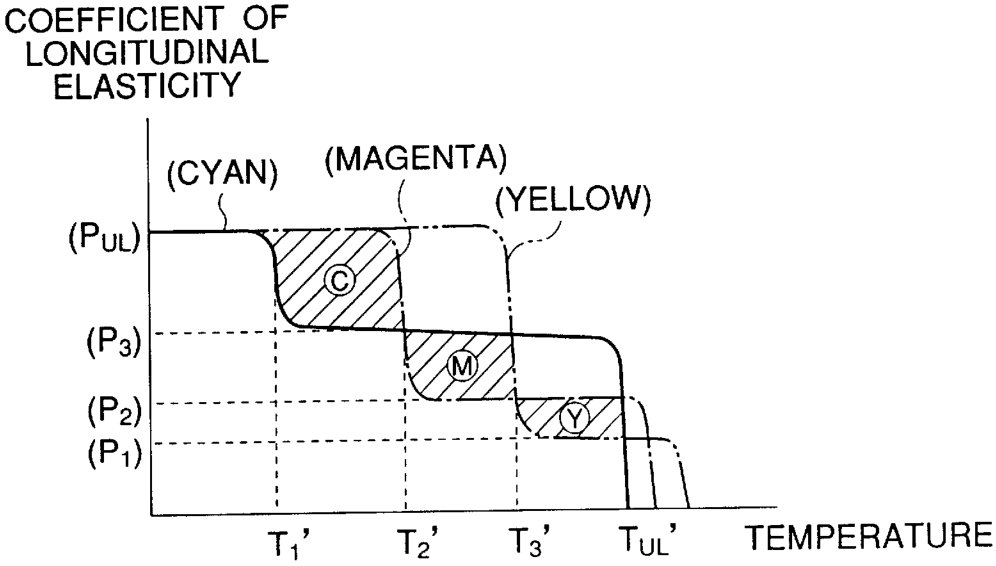
FIG. 28 is a graph showing temperature/pressure breaking characteristics of respective cyan, magenta and yellow microcapsules included in a second microcapsule layer shown in FIG. 27.

As is apparent from the graph of FIG. 28, a shape memory resin of the cyan microcapsules is prepared so as to exhibit a characteristic longitudinal elasticity coefficient having a glass-transition temperature $T_1'$, indicated by the solid line; a shape memory resin of the magenta microcapsules is prepared so as to exhibit a characteristic longitudinal elasticity coefficient having a glass-transition temperature $T_2'$, indicated by the single-chained line; and a shape memory resin of the yellow microcapsules is prepared so as to exhibit a characteristic longitudinal elasticity coefficient having a glass-transition temperature $T_3'$, indicated by the double-chained line. Also, the glass-transition temperatures $T_1'$, $T_2'$, and $T_3'$ are lower than the glass-transition temperatures $T_1$, $T_2$ and $T_3$, shown in the graph of FIG. 3.

Accordingly, when the image-forming substrate 140 is fed in the printer, as shown in FIG. 6, such that the transparent protective film 142C contacts the thermal heads (30C, 30M and 30Y), the cyan, magenta and yellow microcapsules, included in the first microcapsule layer 142B, and the cyan, magenta and yellow microcapsules, included in the second microcapsule layer 144B, are selectively broken and squashed in accordance with respective digital color image-pixel signals, whereby two color images can be simultaneously formed on the first and second microcapsule layer 142B and 144B of the image-forming substrate 140.

In particular, when the image-forming substrate 140 is heated by the thermal heads (30C, 30M and 30Y), a temperature of the second microcapsule layer 144B is lower than a temperature of the first microcapsule layer 142B, due to the interposition of the first paper sheet 142A and the peeling layer 146 between the first and second microcapsule layers 142B and 144B. Nevertheless, since the glass-transition temperatures $T_1'$, $T_2'$ and $T_3'$ are set to be correspondingly lower than the glass-transition temperatures $T_1$, $T_2$ and $T_3$, shown in the graph of FIG. 3, the simultaneous formation of the respective color images on the first and second microcapsule layers 142B and 144B is made possible.

As already stated hereinbefore, the second image-forming substrate element 144 can be easily peeled from the peeling layer 146 when the image-forming substrate 140 is torn into the two substrate elements 142 and 144. Accordingly, after the simultaneous formation of the respective color images on the first and second microcapsule layers 142B and 144B, it is possible to individually obtain the respective first and second image-forming substrate elements 142 and 144 carrying the formed color images, as shown in FIG. 29.

Similar to the fourth embodiment, in the eighth embodiment, a leuco-pigment may be utilized as an ink to be encapsulated in the microcapsules. In this case, a transparent color developer, which reacts with the leuco-pigment, may be contained in two respective binder solutions, which are used for the formation of the first and second microcapsule layers 142B and 144B. Optionally, a first layer of color developer may be interposed between the first paper sheet 142A and the first microcapsule layer 142B, and a second layer of color developer may be interposed between the second paper sheet 144A and the second microcapsule layer 144B.

Figure 30:
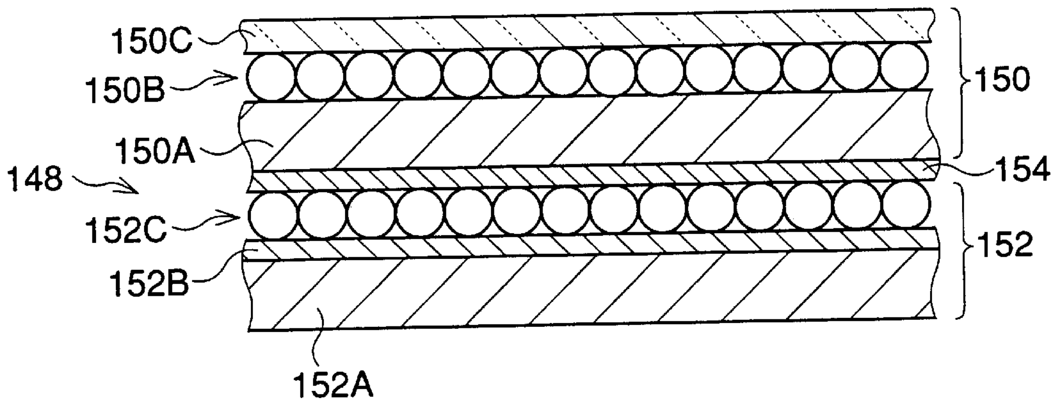
FIG. 30 is a schematic conceptual cross-sectional view transfer showing a tenth embodiment of an image-forming substrate, according to the present invention.

FIG. 30 shows a tenth embodiment of an image-forming substrate, generally indicated by reference 148, according to the present invention. Similar to the ninth embodiment, in this tenth embodiment, the image-forming substrate 148 is produced in a form of a duplicating-paper sheet or a double-recording-paper sheet. Namely, the image-forming substrate 148 comprises a first image-forming substrate element 150, a second image-forming substrate element 152, and a peeling layer 154 interposed between the first and second image-forming substrate elements 150 and 152 and composed of a teflon-based coating material or a silicone-based coating material.

In particular, the first image-forming substrate element 150 includes a first sheet of paper 150A, a first layer of microcapsules 150B coated over a surface of the first paper sheet 150A, and a sheet of transparent protective film 150C covering the first microcapsule layer 150B, and the second image forming substrate element 152 includes a second sheet of paper 152A, a layer of color developer formed over the second paper sheet 152B, and a second layer of microcapsules 152C coated over the color developer layer 152B. The peeling layer 154 is provided between the other surface of the first paper sheet 150A and the second microcapsule layer 152C, as shown in FIG. 30.

In the tenth embodiment, the first microcapsule layer 150B is substantially identical to the microcapsule layer 14 of the first embodiment shown in FIG. 1. Namely, the cyan, magenta and yellow microcapsules, included in the first microcapsule layer 152B, exhibit the temperature/pressure characteristics as shown in FIG. 3. Accordingly, by suitably selecting a heating temperature and a breaking pressure, which should be exerted on the first image-forming substrate element 150, the cyan, magenta and yellow microcapsules can be selectively broken and squashed, and thus a color image can be formed on the first image-forming substrate element 150.

On the other hand, the second microcapsule layer 152C is formed from three types of microcapsules: a first type of microcapsules filled with a first liquid leuco-pigment, a second type of microcapsules filled with a second liquid leuco-pigment, and a third type of microcapsules filled with a third liquid leuco-pigment, and the respective first, second and third liquid leuco-pigments react with the color developer, included in the color developer layer 152B, to thereby produce cyan, magenta and yellow. The respective first, second and third microcapsules, included in the second microcapsule layer 152C, exhibit the temperature/pressure characteristics as shown in the graph of FIG. 28. Thus, by suitably selecting a heating temperature and a breaking pressure, which should be exerted on the second image-forming substrate element 152, the first, second and third microcapsules can be selectively broken and squashed, and thus a color image can be formed on the second image-forming substrate element 152.

Accordingly, similar to the ninth embodiment, when the image-forming substrate 148 is fed in the printer, as shown in FIG. 6, such that the transparent protective film 150C contacts the thermal heads (30C, 30M and 30Y), the cyan, magenta and yellow microcapsules, included in the first microcapsule layer 150B, and the first, second and third microcapsules, included in the second microcapsule layer 152C, are selectively broken and squashed in accordance with respective digital color image-pixel signals, whereby two color images can be simultaneously formed on the first and second microcapsule layers 150B and 152C of the image-forming substrate 148.

Figure 31:
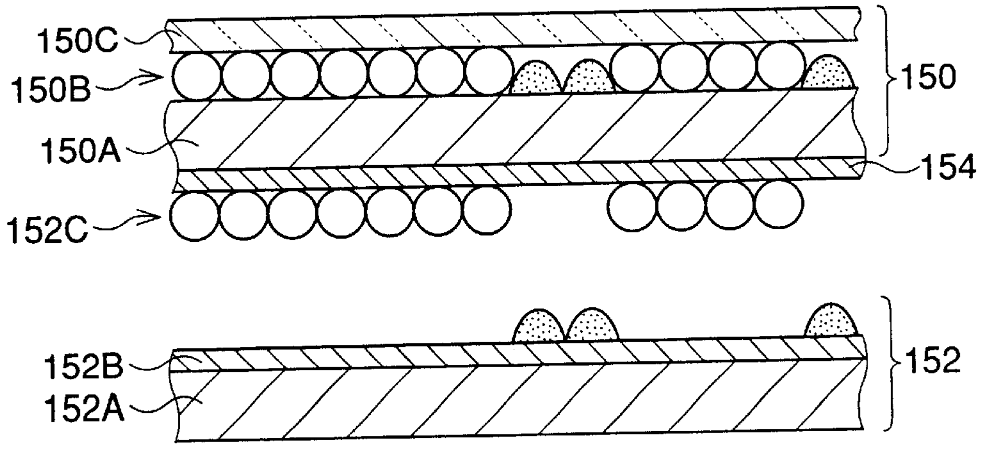
FIG. 31 is a schematic conceptual cross-sectional view showing the tenth embodiment of the image-forming substrate of FIG. 30 at an aspect different from that of FIG. 30.

In the image-forming substrate 148, the peeling layer 154 is formed on and adhered to the other surface of the first paper sheet 150A with a sufficiently large adhesive force. Also, the microcapsule shells of the second microcapsule layer 152C are adhered to the peeling layer 154 with a larger adhesive force than that which adheres the microcapsule shells of the second microcapsule layer 152C to the peeling layer 154. Nevertheless, the leuco-pigment, seeped from a broken or compacted microcapsule, can be easily separated from the peeling layer 154. Accordingly, after the simultaneous formation of the respective color images on the first and second microcapsule layers 150B and 152C, when the image-forming substrate 148 is torn into the two substrate elements 150 and 152, the second paper sheet 152A with the color developer layer 152B carrying the formed color image is peeled from the peeling layer 154, as shown in FIG. 31.

According to the tenth embodiment, since the second paper sheet 152A with the color developer layer 152B carrying the formed color image has no unbroken microcapsules, the formed color image cannot be subjected to damage even if a large external force is exerted on the second paper sheet 152A and even if the second paper sheet 152A is carelessly heated.

Figure 32:
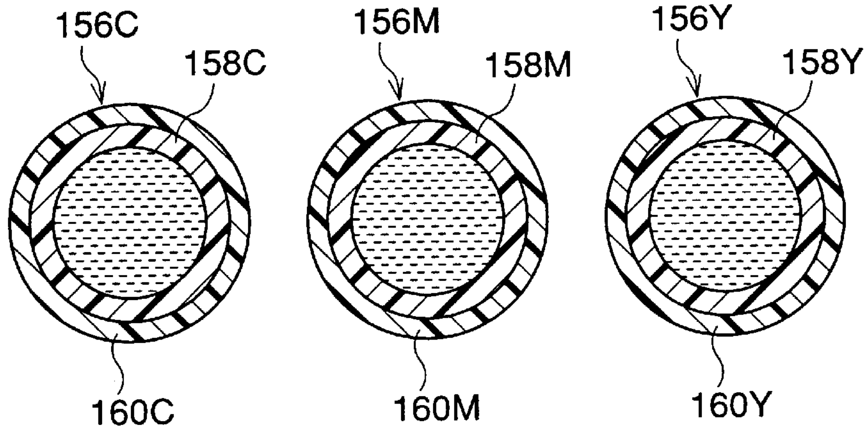
FIG. 32 is a cross-sectional view showing three types of cyan, magenta and yellow microcapsules, respectively, as another embodiment of a microcapsule according to the present invention.

FIG. 32 shows another embodiment of a microcapsule filled with a dye or ink. In this drawing, respective references 156C, 156M and 156Y indicate a cyan microcapsule, a magenta microcapsule, and a yellow microcapsule. A shell wall of each microcapsule is formed as a double-shell wall. The inner shell wall element (158C, 158M, 158Y) of the double-shell wall is formed of a shape memory resin, and the outer shell wall element (160C, 160M, 160Y) is formed of a suitable resin, which does not exhibit a shape memory characteristic.

Figure 33:
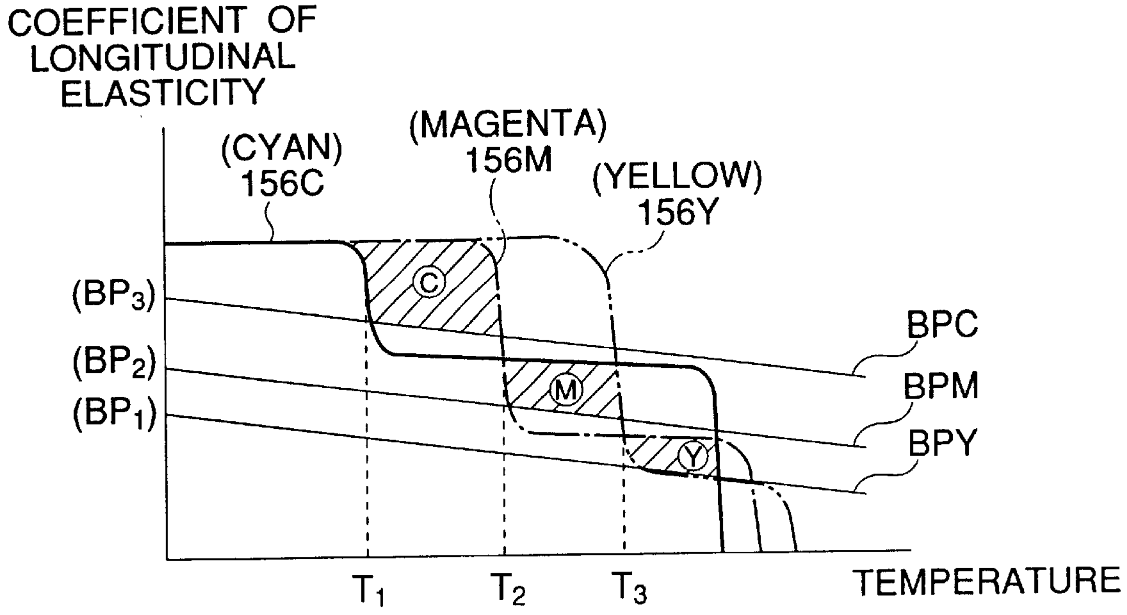
FIG. 33 is a graph showing temperature/pressure breaking characteristics of the cyan, magenta and yellow microcapsules shown in FIG. 32.

As is apparent from a graph in FIG. 33, the inner shell walls 158C, 158M and 158Y exhibit characteristic longitudinal elasticity coefficients indicated by a solid line, a single-chained line and a double-chained line, respectively, and these inner shells are selectively broken and compacted under the temperature/pressure conditions as mentioned above.

Also, the outer shell wall 160C, 160M and 160Y exhibits temperature/pressure breaking characteristics indicated by reference BPC, BPM and BPY, respectively. Namely, the outer shell wall 160C is broken and squashed when subjected to a pressure beyond $BP_3$; the outer shell wall 160M is broken and squashed when subjected to a pressure beyond $BP_2$; and the outer shell wall 160Y is broken and squashed when subjected to a pressure beyond $BP_1$.

Thus, as shown in the graph of FIG. 33, a cyan-producing area, a magenta-producing area and a yellow-producing area are defined as a hatched area C, a hatched area M and a hatched area Y, respectively, by a combination of the characteristic longitudinal elasticity coefficients (indicated by the solid line, single-chained line and double-chained line) and the temperature/pressure breaking characteristics BPC, BPM and BPY.

Note, by suitably varying compositions of well-known resins and/or by selecting a suitable resin from among well-known resins, it is possible to easily obtain microcapsules that exhibit the temperature/pressure breaking characteristics BPC, BPM and BPY.

According to the microcapsules 156C, 156M and 156Y shown in FIG. 32, regardless of the characteristic longitudinal elasticity coefficient of each microcapsule, it is a possible option to accurately determine a critical breaking pressure for each microcapsule.

Note, in the embodiment shown in FIG. 32, the inner shell wall element (158C, 158M, 158Y) and the outer shell wall element (160C, 160M, 160Y) may replace each other. Namely, when the outer shell wall element of the double-shell wall is formed of the shape memory resin, the inner shell wall element is formed of the suitable resin, which does not exhibit the shape memory characteristic.

Figure 34:
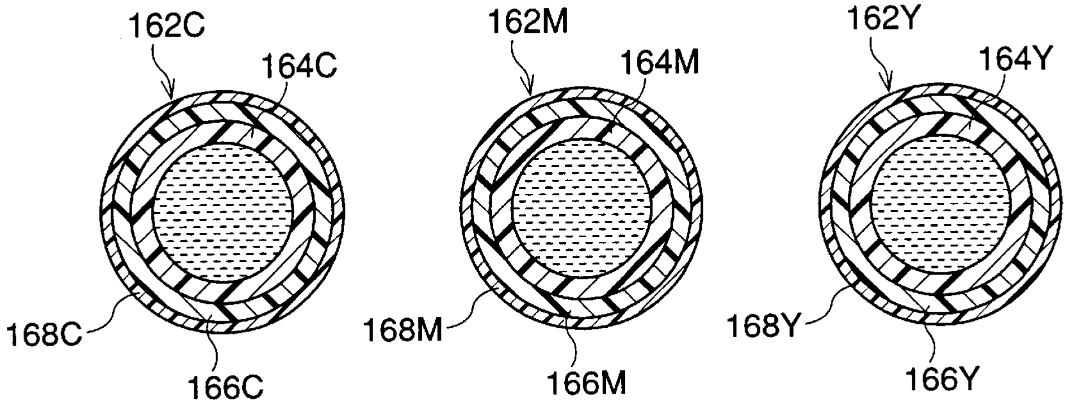
FIG. 34 is a cross-sectional view showing three types of cyan, magenta and yellow microcapsules, respectively, as yet another embodiment of a microcapsule according to the present invention.

FIG. 34 shows yet another embodiment of a microcapsule filled with a dye or ink. In this drawing, respective references 162C, 162M and 162Y indicate a cyan microcapsule, a magenta microcapsule, and a yellow microcapsule. A shell wall of each microcapsule is formed as a composite shell wall. In this embodiment, each composite shell wall comprises an inner shell wall element (164C, 164M, 164Y), an intermediate shell wall element (166C, 166M, 166Y) and an outer shell element (168C, 168M, 168Y), and these shell wall elements are formed from suitable resins, which do not exhibit shape memory characteristics.

Figure 35:
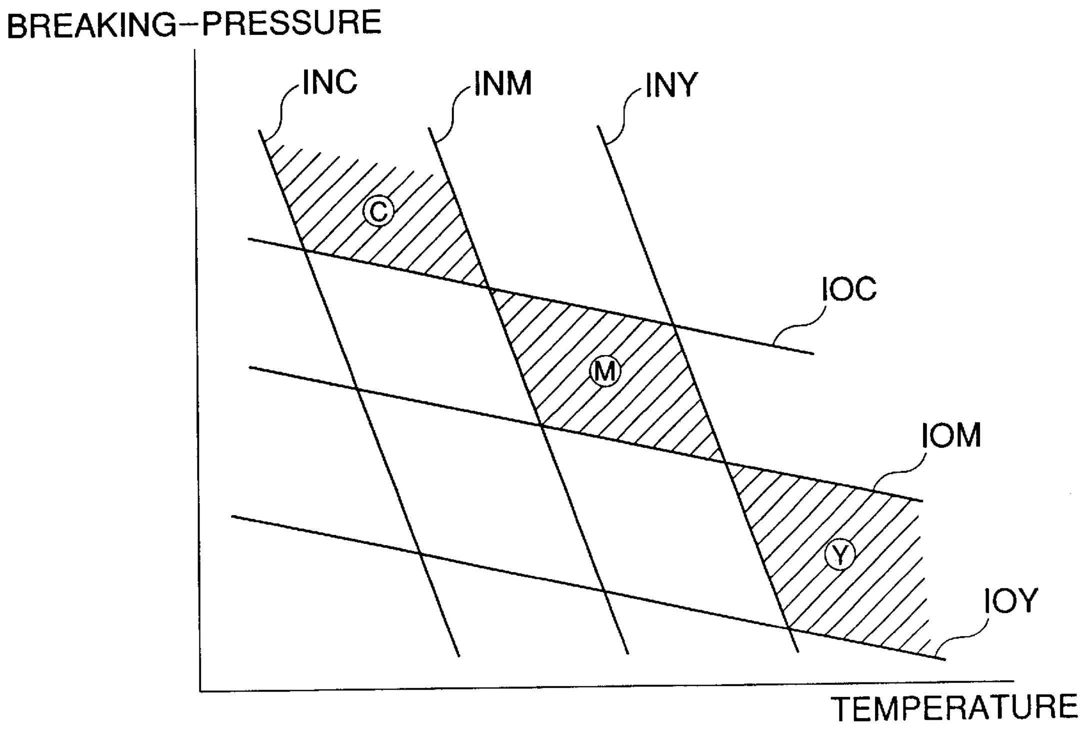
FIG. 35 is a graph showing temperature/pressure breaking characteristics of the cyan, magenta and yellow microcapsules shown in FIG. 34.

In a graph in FIG. 35, the inner shell walls 164C, 164M and 164Y exhibit temperature/pressure breaking characteristics indicated by references INC, INM and INY, respectively. Also, reference IOC indicates a resultant temperature/pressure breaking characteristic of both the intermediate and outer shell walls 166C and 168C; reference IOM indicates a resultant temperature/pressure breaking characteristic of both the intermediate and outer shell walls 166M and 168M; and reference IOY indicates a resultant temperature/pressure breaking characteristic of both the intermediate and outer shell walls 166Y and 168Y.

Thus, as shown in the graph of FIG. 35, by a combination of the temperature/pressure breaking characteristics (INC, INM and INY; IOC, IOM and IOY), a cyan-producing area, a magenta-producing area and a yellow-producing area are defined as a hatched area C, a hatched area M and a hatched area Y, respectively.

Note, similar to the above-mentioned case, by suitably varying compositions of well known resins, by selecting a suitable resin from among the well-known resins, and/or by suitably regulating a thickness of each shell wall, it is possible to easily obtain resins exhibiting the temperature/pressure breaking characteristics (INC, INM and INY; IOC, IOM and IOY).

According to the microcapsules 162C, 162M and 162Y, shown in FIG. 34, both critical breaking temperature and pressure for each microcapsule can be optimally and exactly determined.

Figure 36:
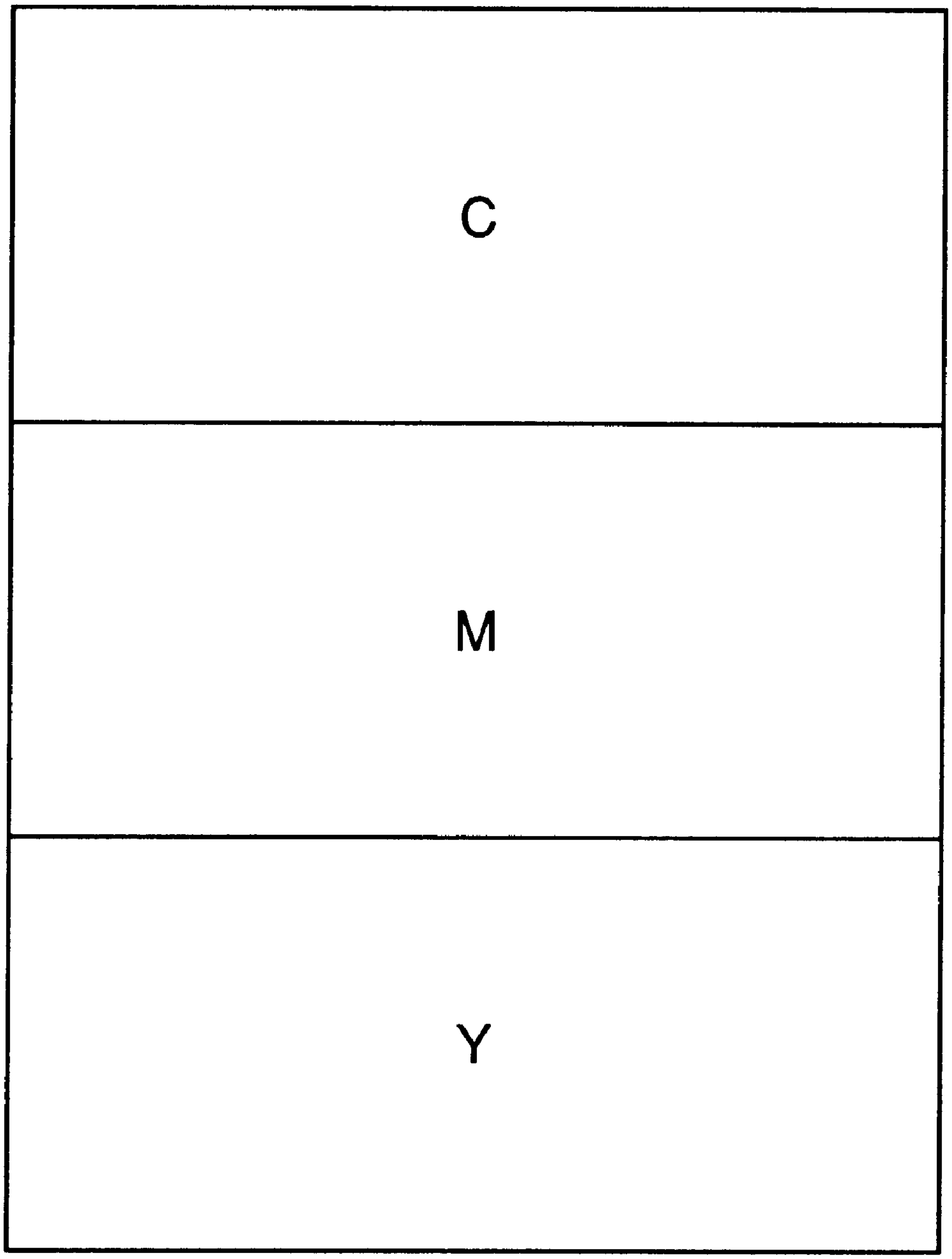
FIG. 36 is a schematic plan view showing a further embodiment of an image-forming substrate, according to the present invention.

Although all of the above-mentioned embodiments are directed to a formation of a color image, the present invention may be applied to a formation of a monochromatic image. In this case, a layer of microcapsules (14, 60, 72, 84, 100, 116, 124, 134, 142B, 144B, 150B, 152C) is composed of only one type of microcapsule filled with, for example, a black ink. Also, as shown in FIG. 36, a cyan microcapsule layer, a magenta microcapsule layer and a yellow microcapsule layer may be formed on divided area sections C, M and Y, respectively, of a single image-forming substrate. When this image-forming substrate is fed in the printer as shown in FIG. 6, a cyan image is formed on the area of section C by the thermal head (30C); a magenta image is formed on the area of section M by the thermal head (30M); and a yellow image is formed on the area of section Y by the thermal head (30Y).

Finally, it will be understood by those skilled in the art that the foregoing description is of preferred embodiments of the image-forming substrate, and that various changes and modifications may be made to the present invention without departing from the spirit and scope thereof.

The present disclosure relates to subject matters contained in Japanese Patent Applications No. 9-247688 (filed on Aug. 28, 1997) and No. 9-251365 (filed on Sep. 1, 1997) which are expressly incorporated herein, by reference, in their entireties.

What is claimed is:

1. An image-forming substrate comprising:

a base member; and a layer of microcapsules, coated on said base member, that contains at least one type of microcapsules filled with a liquid dye, said at least one type of microcapsules exhibiting a temperature and pressure characteristic such that said at least one type of microcapsules is squashed when being simultaneously subjected to a predetermined pressure and a predetermined temperature above ambient temperature, resulting in seepage of said liquid dye from said squashed microcapsule, wherein a viscosity of said liquid dye varies in accordance with a degree of surface roughness of said base member such that the seeped liquid dye is securely affixed to said base member.

2. An image-forming substrate as set forth in claim 1, wherein said base member comprises a printing paper, and as the degree of surface roughness of said printing paper decreases the viscosity of said liquid dye increases.

3. An image-forming substrate as set forth in claim 2, wherein said base member comprises an ordinary printing paper, and the viscosity of said liquid dye is approximately 10 cP.

4. An image-forming substrate as set forth in claim 2, wherein said base member comprises a calendered printing paper, and the viscosity of said liquid dye is approximately 100 cP.

5. An image-forming substrate as set forth in claims 2, wherein said base member comprises a coated printing paper, and the viscosity of said liquid dye is approximately 1000 cP.

6. An image-forming substrate as set forth in claim 1, wherein a shell wall of each of said microcapsules is composed of a shape memory resin, which exhibits a glass-transition temperature corresponding to said predetermined temperature.

7. An image-forming substrate as set forth in claim 1, wherein a shell wall of each of said microcapsules comprises a double-shell wall, one shell wall element of said double-shell wall being composed of a shape memory resin, another shell wall element of said double-shell wall being composed of a resin not exhibiting a shape memory characteristic, such that said temperature and pressure characteristic is a resultant temperature and pressure characteristic of both said shell wall elements.

8. An image-forming substrate as set forth in claim 1, wherein a shell wall of each of said microcapsules comprises a composite-shell wall including at least two shell wall elements formed of different types of resin not exhibiting a shape memory characteristic, such that said temperature and pressure characteristic is a resultant temperature and pressure characteristic of said shell wall elements.

9. An image-forming substrate as set forth in claim 1, wherein said microcapsule layer is covered with a sheet of transparent protective film.

10. An image-forming substrate as set forth in claim 1, wherein:

said microcapsule layer includes a first type of microcapsules filled with a first dye and a second type of microcapsules filled with a second dye;

said first type of microcapsules exhibiting a first temperature and pressure characteristic such that said first type of microcapsules is squashed when being simultaneously subjected to a first pressure and a first temperature, resulting in a seepage of said first dye from said squashed microcapsule; and said second type of microcapsules exhibiting a second temperature and pressure characteristic such that said second type of microcapsules is squashed when being simultaneously subjected to a second pressure and a second temperature, resulting in seepage of said second dye from said squashed microcapsule.

11. An image-forming substrate as set forth in claim 10, wherein said first temperature is lower than said second temperature, and said first pressure is higher than said second pressure.

12. An image-forming substrate as set forth in claim 1, wherein:

said microcapsule layer includes a first type of microcapsules filled with a first dye, a second type of microcapsules filled with a second dye, and a third type of microcapsules filled with a third dye;

said first type of microcapsules exhibiting a first temperature and pressure characteristic such that said first type of microcapsules is squashed when being simultaneously subjected to a first pressure and a first temperature, resulting in seepage of said first dye from said squashed microcapsule;

said second type of microcapsules exhibiting a second temperature and pressure characteristic such that said second type of microcapsules is squashed when being simultaneously subjected to a second pressure and a second temperature, resulting in a seepage of said second dye from said squashed microcapsule; and said third type of microcapsules exhibiting a third temperature and pressure characteristic such that said third type of microcapsules is squashed when being simultaneously subjected to a third pressure and a third temperature, resulting in a seepage of said third dye from said squashed microcapsule.

13. An image-forming substrate as set forth in claim 12, wherein said first, second and third temperatures are respectively low, medium and high with respect to each other, and said first, second and third pressures are respectively high, medium and low with respect to each other.

14. An image-forming substrate as set forth in claim 12, wherein said first, second, and third dyes each comprising one of three primary colors.

15. An image-forming substrate comprising:

a base member; and a layer of transparent microcapsules, coated on said base member, that contains at least one type of transparent microcapsules filled with a transparent liquid dye, said at least one type of transparent microcapsules exhibiting a temperature and pressure characteristic such that said at least one type of transparent microcapsules is squashed when being simultaneously subjected to a predetermined pressure and a predetermined temperature above ambient temperature, whereby said transparent liquid dye seeps from said squashed microcapsule and reacts with a transparent color developer to produce a predetermined single color.

16. An image-forming substrate as set forth in claim 15, wherein said base member comprises a transparent plastic sheet.

17. An image-forming substrate as set forth in claim 16, wherein a layer of said transparent color developer is formed on a surface of said transparent plastic sheet formed on a surface thereof, and said transparent microcapsule layer is coated over said transparent color developer layer.

18. An image-forming substrate as set forth in claim 16, wherein said transparent color developer is contained in a transparent binder solution used to form said transparent microcapsule layer.

19. An image-forming substrate as set forth in claim 15, wherein said base member comprises a sheet of paper.

20. An image-forming substrate as set forth in claim 19, wherein a layer of said transparent color developer is formed on a surface of said paper sheet, and said transparent microcapsule layer is coated over said transparent color developer layer.

21. An image-forming substrate as set forth in claim 19, wherein said transparent color developer is contained in a binder solution used to form said transparent microcapsule layer.

22. An image-forming substrate as set forth in claim 15, wherein a shell wall of said at least one type of microcapsules is composed of a shape memory resin, which exhibits a glass-transition temperature corresponding to said predetermined temperature.

23. An image-forming substrate as set forth in claim 15, wherein a shell wall of said at least one type of microcapsules comprises a double-shell wall, one shell wall element of said double-shell wall being composed of a shape memory resin, another shell wall element of said double-shell wall being composed of a resin not exhibiting a shape memory characteristic, such that said temperature and pressure characteristic is a resultant temperature and pressure characteristic of both said shell wall elements.

24. An image-forming substrate as set forth in claim 15, wherein a shell wall of said at least one type of microcapsules comprises a composite-shell wall including at least two shell wall elements formed of different types of resin not exhibiting a shape memory characteristic, such that said temperature and pressure characteristic is a resultant temperature/pressure characteristic of said shell wall elements.

25. An image-forming substrate as set forth in claim 15, wherein said microcapsule layer is covered with a sheet of transparent protective film.

26. An image-forming substrate as set forth in claim 15, wherein:

said transparent microcapsule layer includes a first type of transparent microcapsules filled with a first transparent dye and a second type of transparent microcapsules filled with a second transparent dye;

said first type of transparent microcapsules exhibiting a first temperature and pressure characteristic such that said first type of microcapsule is squashed when being simultaneously subjected to a first pressure and a first temperature, whereby said first transparent dye seeps from said squashed microcapsule and reacts with said transparent color developer to produce a first single color; and said second type of transparent microcapsules exhibiting a second temperature and pressure characteristic such that said second type of microcapsules is squashed when being simultaneously subjected to a second pressure and a second temperature, whereby said second transparent dye seeps from said squashed microcapsule and reacts with said transparent color developer to produce a second single color.

27. An image-forming substrate as set forth in claim 26, wherein said first temperature is lower than said second temperature, and said first pressure is higher than said second pressure.

28. An image-forming substrate as set forth in claim 15, wherein:

said transparent microcapsule layer includes a first type of transparent microcapsules filled with a first transparent dye, a second type of transparent microcapsules filled with a second transparent dye, and a third type of transparent microcapsules filled with a third transparent dye;

said first type of transparent microcapsules exhibiting a first temperature and pressure characteristic such that said first type of microcapsules is squashed when being simultaneously subjected to a first pressure and a first temperature, whereby said first transparent dye seeps from said squashed microcapsule and reacts with said transparent color developer to produce a first single color;

said second type of transparent microcapsules exhibiting a second temperature and pressure characteristic such that said second type of microcapsules is squashed when being simultaneously subjected to a second pressure and a second temperature, whereby said second transparent dye seeps from said squashed microcapsule and reacts with said transparent color developer to produce a second single color; and said third type of transparent microcapsules exhibiting a third temperature and pressure characteristic such that said third type of transparent microcapsules is squashed when being simultaneously subjected to a third pressure and a third temperature, whereby said third transparent dye seeps from said squashed microcapsule and reacts with said transparent color developer to produce a third single color.

29. An image-forming substrate as set forth in claim 28, wherein said first, second and third temperatures are respectively low, medium and high with respect to each other, and said first, second and third pressure are respectively high, medium and low with respect to each other.

30. An image-forming substrate as set forth in claim 28, wherein said first, second, and third dyes each comprising one of three-primary colors.

31. An image-forming substrate comprising:

a base member; and a layer of microcapsules, coated on said base member, that contains at least one type of microcapsules filled with a dye, said at least one type of microcapsules exhibiting a temperature and pressure characteristic such that said at least one type of microcapsules is squashed when being simultaneously subjected to a predetermined pressure and a predetermined temperature above ambient temperature, resulting in seepage of said dye from said squashed microcapsule, wherein at least one layer of function is incorporated in said image-forming substrate for achieving a given purpose.

32. An image-forming substrate as set forth in claim 31, wherein said function layer comprises a sheet of transparent ultraviolet barrier film covering the microcapsule layer.

33. An image-forming substrate as set forth in claim 32, wherein said transparent ultraviolet barrier film sheet is covered with a sheet of transparent protective film.

34. An image-forming substrate as set forth in claim 31, wherein said function layer comprises a white coat layer formed on a surface of said base member to give a desired white quality to said surface, and said microcapsule layer is formed over the surface of said white coat layer.

35. An image-forming substrate as set forth in claim 31, wherein said function layer comprises an electrical conductive layer formed on another surface of said base member.

36. An image-forming substrate as set forth in claim 31, wherein said base member comprises a sheet of paper, and said function layer comprises a layer of adhesive formed on another surface of said paper sheet, and a sheet of release paper applied to said adhesive layer.

37. An image-forming substrate as set forth in claim 31, wherein said base member comprises a sheet of film composed of a suitable synthetic resin, and said function layer comprises a peeling layer formed over a surface of the film sheet, and a layer of transparent ultraviolet barrier formed on said peeling layer, said microcapsule layer being coated over said ultraviolet barrier layer.

38. An image-forming substrate as set forth in claim 37, further comprising another layer of function including an electrical conductive layer formed on another surface of said film sheet, and a sheet of protective film applied to said electrical conductive layer.

39. An image-forming substrate as set forth in claim 31, wherein said base member comprises a sheet of film composed of a suitable transparent synthetic resin, and said function layer comprises a peeling layer formed on a surface of said transparent film sheet, and a layer of transparent ultraviolet barrier formed on said peeling layer, said microcapsule layer being coated over said transparent ultraviolet barrier layer.

40. An image-forming substrate as set forth in claim 31, wherein said base member comprises a sheet of board paper, and said function layer comprises a heat-sensitive recording layer formed on another surface of said board paper sheet.

41. An image-forming substrate as set forth in claim 31, wherein said base member comprises a sheet composed of a suitable transparent synthetic resin, and said function layer comprises a heat-sensitive recording layer formed on another surface of said transparent sheet.

42. An image-forming substrate as set forth in claim 31, wherein said dye comprises a transparent liquid dye, and said transparent liquid dye reacts with a color developer to produce a given single color when seepage from said squashed microcapsule occurs.

43. An image-forming substrate as set forth in claim 31, wherein a shell wall of said at least one type of microcapsules is composed of a shape memory resin that exhibits a glass-transition temperature corresponding to said predetermined temperature.

44. An image-forming substrate as set forth in claim 31, wherein a shell wall of said at least one type of microcapsules comprises a double-shell wall, one shell wall element of said double-shell wall being composed of a shape memory resin, another shell wall element of said double-shell wall being composed of a resin not exhibiting a shape memory characteristic, such that said temperature and pressure characteristic is a resultant temperature and pressure characteristic of both said shell wall elements.

45. An image-forming substrate as set forth in claim 31, wherein a shell wall of said at least one type of microcapsules comprises a composite-shell wall including at least two shell wall elements formed of different types of resin not exhibiting a shape memory characteristic, such that said temperature and pressure characteristic is a resultant temperature and pressure characteristic of said shell wall elements.

46. An image-forming substrate as set forth in claim 31, wherein:

said microscapsule layer includes a first type of microcapsules filled with a first transparent dye and a second type of microcapsules filled with a second dye;

said first type of microcapsules exhibiting a first temperature and pressure characteristic such that said first type of microcapsules is squashed when being simultaneously subjected to a first pressure and a first temperature, resulting in seepage of said first dye from said squashed microcapsule; and said second type of microcapsules exhibiting a second temperature and pressure characteristic such that said second type of microcapsules is squashed when being simultaneously subjected to a second pressure and a second temperature, resulting in seepage of said second dye from said squashed microcapsule.

47. An image-forming substrate as set forth in claim 46, wherein said first temperature is lower than said second temperature, and said first pressure is higher than said second pressure.

48. An image-forming substrate as set forth in claim 31, wherein:

said microcapsule layer includes a first type of microcapsules filled with a first dye, a second type of microcapsules filled with a second dye, and a third type of microcapsules filled with a third dye;

said first type of microcapsules exhibiting a first temperature and pressure characteristic such that said first type of microcapsules is squashed when being simultaneously subjected to a first pressure and a first temperature, resulting in seepage of said first dye from said squashed microcapsule;

said second type of microcapsules exhibiting a second temperature and pressure characteristic such that said second type of microcapsules is squashed when being simultaneously subjected to a second pressure and a second temperature, resulting in seepage of said second dye from said squashed microcapsule; and said third type of microcapsules exhibiting a third temperature and pressure characteristic such that said third type of microcapsules is squashed when being simultaneously subjected to a third pressure and a third temperature, resulting in seepage of said third dye from said squashed microcapsule.

49. An image-forming substrate as set forth in claim 48, wherein said first, second and third temperatures are respectively low, medium and high, with respect to each other, and said first, second and third pressure are relatively high, medium and low with respect to each other.

50. An image-forming substrate as set forth in claim 48, wherein said first, second, and third dyes each comprising one of three-primary colors.

51. An image-forming substrate comprising:

a first image-forming substrate element that includes a first sheet of paper and a first layer of microcapsules coated on a surface of said first paper sheet, said first microcapsule layer containing at least one type of microcapsules filled with a dye, said at least one type of microcapsules exhibiting a temperature and pressure characteristic such that said at least one type of microcapsules is squashed when being simultaneously subjected to a first predetermined pressure and a first predetermined temperature above ambient temperature, resulting in seepage of said dye from said squashed microcapsule;

a second image-forming substrate element that includes a second sheet of paper and a second layer of microcapsules coated over a surface of said second paper sheet, said second microcapsule layer containing at least one type of microcapsules filled with a dye, said at least one type of microcapsules exhibiting a temperature and pressure characteristic such that said at least one type of microcapsules is squashed when being simultaneously subjected to a second predetermined pressure and a second predetermined temperature above ambient temperature, resulting in seepage of said dye from said squashed microcapsule; and an peeling layer interposed between said first and second image-forming substrate elements, wherein said first and second predetermined pressures and said first and second predetermined temperatures are simultaneously applied to said first and second image-forming substrate elements, and said second image-forming substrate is peelable from said peeling layer.

52. An image-forming substrate as set forth in claim 51, wherein a shell wall of the microcapsules included in said first microcapsule layer is composed of a shape memory resin, which exhibits a glass-transition temperature corresponding to said fist predetermined temperature.

53. An image-forming substrate as set forth in claim 52, wherein a wall of the microcapsules included in said second microcapsule layer is composed of a shape memory resin, which exhibits a glass-transition temperature corresponding to said second predetermined temperature.

54. An image-forming substrate as set forth in claim 52, wherein a shell wall of the microcapsules included said first microcapsule layer comprises a double-shell wall, one shell wall element of said double-shell wall being composed of a transparent shape memory resin, another shell wall element of said double-shell wall being composed of a transparent resin not exhibiting a shape memory characteristic, such that said temperature and pressure characteristic is a resultant temperature and pressure characteristic of both said shell wall elements.

55. An image-forming substrate as set forth in claim 54, wherein a shell wall 6 the microcapsules included in said second microcapsule layer comprises a double-shell wall, one shell wall element of said double-shell wall being composed of a transparent shape memory resin, another shell wall element of said double-shell wall being composed of a transparent resin not exhibiting a shape memory characteristic, such that said temperature and pressure characteristic is a resultant temperature and pressure characteristic of both said shell wall elements.

56. An image-forming substrate as set forth in claim 51, wherein a shell wall of the microcapsules included in said first microcapsule layer comprises a composite-shell wall including at least two shell wall elements formed of different types of transparent resin not exhibiting a shape memory characteristic, such that said temperature and_pressure characteristic is a resultant temperature and pressure characteristic of said shell wall elements.

57. An image-forming substrate as set forth in claim 56, wherein a shell wall of the microcapsules included in said second microcapsule layer comprises a composite-shell wall including at least two shell wall elements formed of different types of transparent resin not exhibiting a shape memory characteristic, such that said temperature and_pressure characteristic is a resultant temperature and pressure characteristic of said shell wall elements.

58. An image-forming substrate as set forth in claim 51, wherein:

said first microcapsule layer includes a first type of microcapsules filled with a first dye and a second type of microcapsules filled with a second dye;

said first type of microcapsules exhibiting a first temperature and pressure characteristic such that said first type of microcapsules is squashed when being simultaneously subjected to a first pressure and a first temperature, resulting in seepage of said first dye from said squashed microcapsule; and said second type of microcapsules exhibiting a second temperature and pressure characteristic such that said second type of microcapsules is squashed when being simultaneously subjected to a second pressure and a second temperature, resulting in seepage of said second dye from said squashed microcapsule.

59. An image-forming substrate as set forth in claim 58, wherein:

said second microcapsule layer includes a first type of microcapsules filled with a first dye and a second type of microcapsules filled with a second dye;

said first type of microcapsules exhibiting a first temperature and pressure characteristic such that said first type of microcapsules is squashed when being simultaneously subjected to a first pressure and a first temperature, resulting in seepage of said first dye from said squashed microcapsule; and said second type of microcapsules exhibiting a second temperature and pressure characteristic such that said second type of microcapsules is squashed when being simultaneously subjected to a second pressure and a second temperature, resulting in seepage of said second dye from said squashed microcapsule.

60. An image-forming substrate as set forth in claim 51, wherein:

said first microcapsule layer includes a first type of microcapsules filled with a first dye, a second type of microcapsules filled with a second dye, and a third type of microcapsules filled with a third dye;

said first type of microcapsules exhibiting a first temperature and pressure characteristic such that said first type of microcapsules is squashed when being simultaneously subjected to a first pressure and a first temperature, resulting in seepage of said first dye from said squashed microcapsule;

said second type of microcapsules exhibiting a second temperature and pressure characteristic such that said second type of microcapsules is squashed when being simultaneously subjected to a second pressure and a second temperature, resulting in seepage of said second dye from said squashed microcapsule; and said third type of microcapsules exhibiting a third temperature and pressure characteristic such that said third type of microcapsules is squashed when being simultaneously subjected to a third pressure and a third temperature, resulting in seepage of said third dye from said squashed microcapsule.

61. An image-forming substrate as set forth in claim 60, wherein:

said second microcapsule layer includes a fourth type of microcapsules filled with the first dye, a fifth type of microcapsules filled with the second dye, and a sixth type of microcapsules filled with the third dye;

said fourth type of microcapsules exhibiting a fourth temperature and pressure characteristic such that said fourth type of microcapsules is squashed when being simultaneously subjected to a fourth pressure and a fourth temperature, resulting in seepage of said first dye from said squashed microcapsule;

said fifth type of microcapsules exhibiting a fifth temperature and pressure characteristic such that said fifth type of microcapsules is squashed when being simultaneously subjected to a fifth pressure and a fifth temperature, resulting in seepage of said second dye from said squashed microcapsule; and said sixth type of microcapsules exhibiting a sixth temperature and pressure characteristic such that said sixth type of microcapsules is squashed when being simultaneously subjected to a sixth pressure and a sixth temperature, resulting in seepage of said third dye from said squashed microcapsule.

* * * * *